(12) United States Patent
Ohnsat

(10) Patent No.: US 9,648,799 B2
(45) Date of Patent: May 16, 2017

(54) TILLAGE IMPLEMENT WITH ENHANCED BLADE GANG ADJUSTABILITY

(71) Applicant: Great Plains Manufacturing, Inc., Salina, KS (US)

(72) Inventor: Michael J. Ohnsat, Tipton, KS (US)

(73) Assignee: Great Plains Manufacturing, Incorporated, Salina, KS (US)

( * ) Notice: Subject to any disclaimer, the term of this patent is extended or adjusted under 35 U.S.C. 154(b) by 339 days.

(21) Appl. No.: 14/468,099

(22) Filed: Aug. 25, 2014

(65) Prior Publication Data

US 2015/0053439 A1 Feb. 26, 2015

Related U.S. Application Data

(60) Provisional application No. 61/870,140, filed on Aug. 26, 2013.

(51) Int. Cl.
  *A01B 21/08* (2006.01)
  *A01B 63/22* (2006.01)
  *A01B 63/114* (2006.01)

(52) U.S. Cl.
  CPC .............. *A01B 63/22* (2013.01); *A01B 21/08* (2013.01); *A01B 63/114* (2013.01)

(58) Field of Classification Search
  CPC ....... A01B 21/08; A01B 21/093; A01B 35/28; A01B 23/06; A01B 21/03; A01B 23/068
  USPC ........ 172/569, 579, 583, 584, 591, 599, 600
  See application file for complete search history.

(56) References Cited

U.S. PATENT DOCUMENTS

| | | | | |
|---|---|---|---|---|
| 633,465 | A * | 9/1899 | Mertes | A01B 1/06 172/349 |
| 5,207,279 | A * | 5/1993 | Nelson | A01B 23/046 172/140 |
| 5,462,123 | A * | 10/1995 | Harlan | A01B 63/32 172/454 |
| 6,612,381 | B2 * | 9/2003 | Powell | A01B 23/046 172/145 |
| 6,695,069 | B2 * | 2/2004 | Rozendaal | A01B 61/046 172/572 |
| 7,000,708 | B2 * | 2/2006 | Powell | A01B 23/046 172/600 |
| 7,108,075 | B2 * | 9/2006 | Powell | A01B 23/046 172/1 |
| 7,578,356 | B2 * | 8/2009 | Newman | A01B 61/04 172/264 |

(Continued)

*Primary Examiner* — Matthew D Troutman
(74) *Attorney, Agent, or Firm* — Hovey Williams LLP

(57) ABSTRACT

A tillage implement has a main frame provided with ground-engaging wheels that support the main frame at a selected height above the ground. Tillage shanks may be provided on the main frame and, if so, have their depth of penetration into the ground determined by the selected height of the main frame. Gangs of freely rotatable circular blades are carried on the main frame for both fore-and-aft angle adjustment relative to the main frame about respective upright pivot axes and up-and-down depth adjustment relative to the main frame about respective horizontal pivot axes. Such angle and/or depth adjustments can be carried out on-the-go from the tractor seat and without raising or lowering the main frame such that if tillage shanks are provided on the main frame, the working depth of the tillage shanks can remain unchanged as the gangs are adjusted.

34 Claims, 37 Drawing Sheets

(56) References Cited

U.S. PATENT DOCUMENTS

| | | | |
|---|---|---|---|
| 7,743,844 B2* | 6/2010 | Kovach | A01B 23/046 172/261 |
| 8,534,374 B2* | 9/2013 | Hake | A01B 21/08 172/599 |
| 8,746,361 B2* | 6/2014 | Hake | A01B 21/08 172/581 |
| 9,370,137 B2* | 6/2016 | Hennes | A01B 21/083 |
| 2002/0125019 A1* | 9/2002 | Rozendaal | A01B 61/046 172/705 |
| 2003/0085045 A1* | 5/2003 | Powell | A01B 23/046 172/181 |
| 2006/0124327 A1* | 6/2006 | Powell | A01B 23/046 172/600 |
| 2012/0312569 A1* | 12/2012 | Redekop | A01B 73/044 172/311 |
| 2013/0048323 A1* | 2/2013 | Hake | A01B 21/08 172/581 |
| 2013/0327550 A1* | 12/2013 | Hake | A01B 21/08 172/580 |

* cited by examiner

US 9,648,799 B2

TILLAGE IMPLEMENT WITH ENHANCED BLADE GANG ADJUSTABILITY

RELATED APPLICATION

This application is related to and claims the priority benefit of prior U.S. Provisional Application No. 61/870,140 filed Aug. 26, 2013, said Provisional Application in its entirety being hereby incorporated by reference into the present specification.

FIELD OF THE INVENTION

The present invention relates generally to the field of agricultural tillage implements.

BACKGROUND AND SUMMARY

Conventional tillage implements (e.g., cultivators, disks, ploughs, chisels, and harrows) are used in a variety of different field conditions and for a variety of different purposes. Some tillage implements are specially configured to operate at high speeds and shallow depths, while other tillage implements are configured for lower speeds and deeper depths. Additionally, some tillage implements are configured to effectively traverse rough or rolling terrain, while other tillage implements are configured to operate on relatively flat ground. Often a single farming operation encounters a variety of conditions that force the farming operation to either purchase multiple types of tillage implements or to operate a single tillage implement in a less than ideal manner. Accordingly, there exists a need for a tillage implement that is effective in a variety of different field conditions and for a variety of different purposes.

The present invention provides a tillage implement whose gangs of circular, rotatable blades can be both angularly adjusted relative to the path of travel of the implement to vary the aggressiveness of the blades and vertically adjusted relative to the main frame of the implement to change the depth of penetration of the blades into the ground. Both of such adjustments can be carried out on-the-go during the course of field operations and without adjusting the height of the implement's main frame such that tillage shanks or other ground-working tools can remain unaffected depth-wise by adjustments of the blade gangs.

Gangs that are angle and depth-adjustable in accordance with the present invention may be incorporated into a tillage implement that is particularly effective in avoiding the placement of untoward stresses and strains on the implement frame and other critical components of the machine as the machine traverses rough, uneven, or rolling terrain during field operations or transport to and from the field. Ground-engaging wheels of the machine are raised and lowered in unison for lifting or lowering the main frame of the machine, but in one preferred embodiment a pair of front wheels that share a portion of the load of the machine's frame can operate in a non-corresponding manner when the terrain encountered by one of the wheels differs significantly from that encountered by the other. The wheels are linked to one another in such a manner that they can shift upwardly or downwardly relative to one another in equal amounts but in opposite directions so as to maintain both wheels touching the ground and the load of the frame equalized on both of the wheels notwithstanding significant differences in the terrain under the wheels. This avoids concentrating the load on only one of the wheels, for example, such as could occur if the wheels were both locked at a fixed height relative to the frame and one of the wheels were to roll over a high spot that raised the frame and caused the other wheel to be lifted completely off the ground.

DETAILED DESCRIPTION

The present invention is susceptible of embodiment in many different forms. While the drawings illustrate, and the specification describes, certain specific embodiments of the invention, it is to be understood that such disclosure is by way of example only. The principles of the present invention are not limited to the particular disclosed embodiments.

Figure 1:
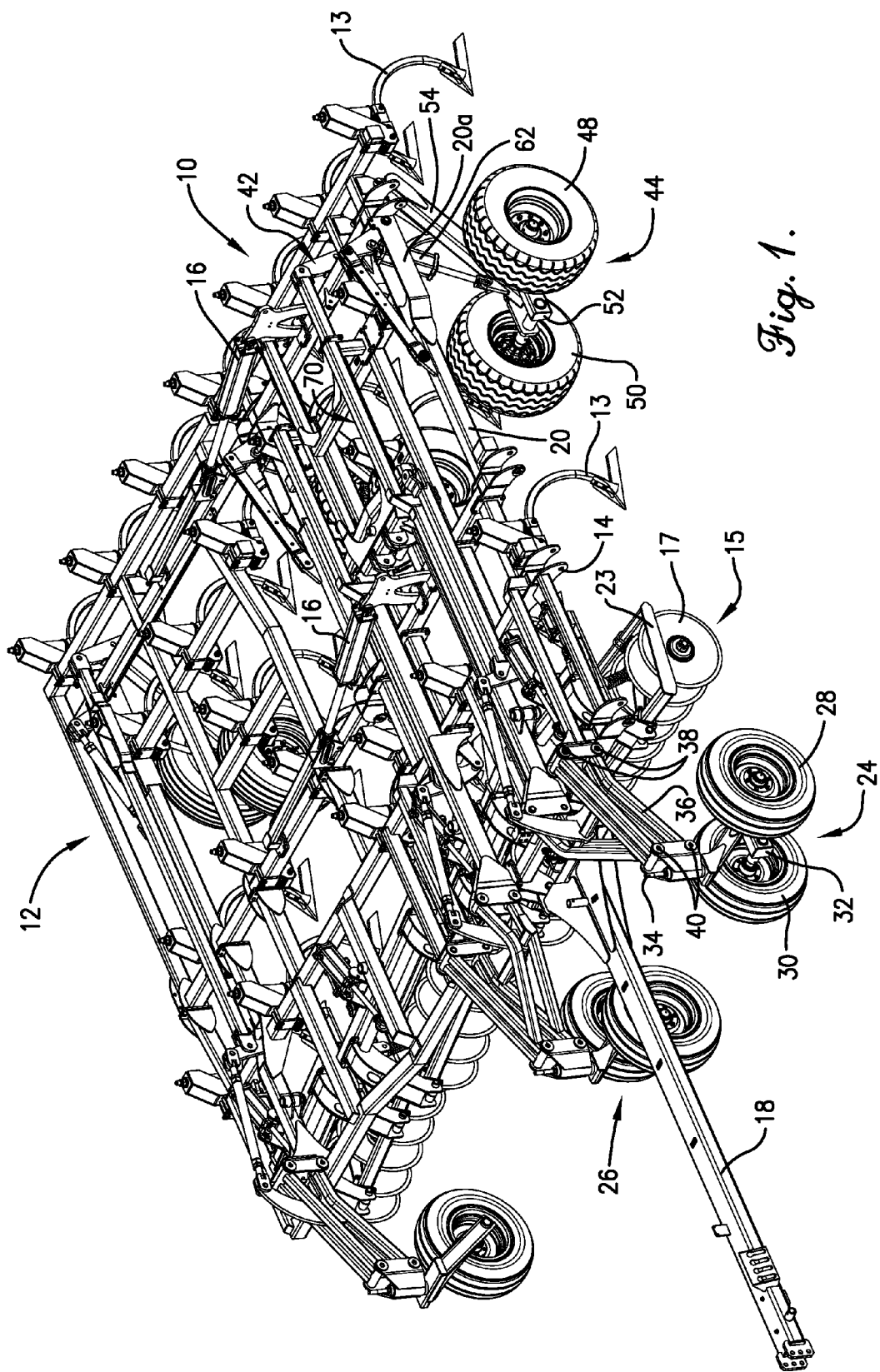
FIG. 1 is a left front isometric view of a multi-section tillage implement constructed in accordance with the principles of the present invention, the left wing section of the implement being removed for clarity.
Figure 2:
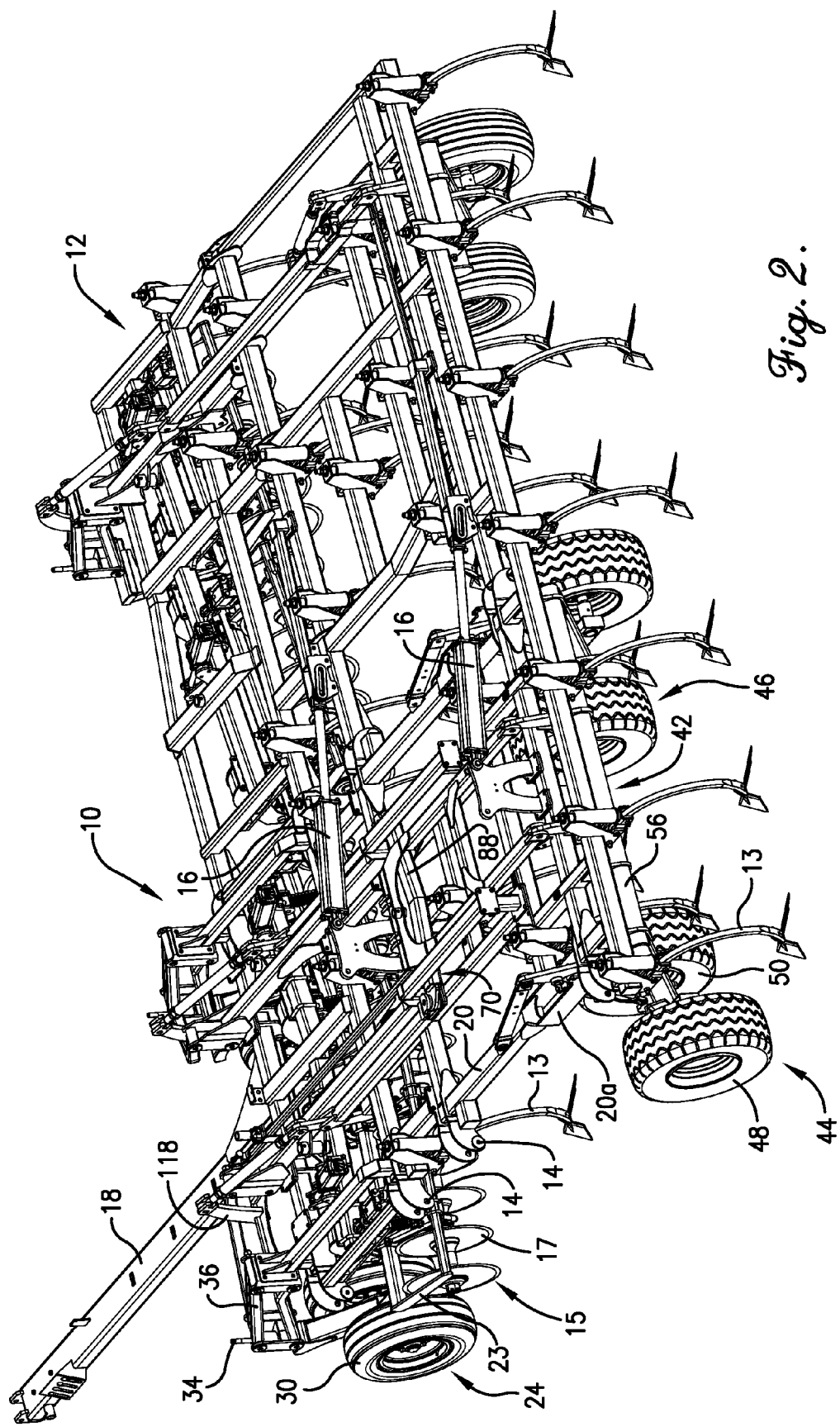
FIG. 2 is a left rear isometric view of the implement taken from above the implement.
Figure 3:
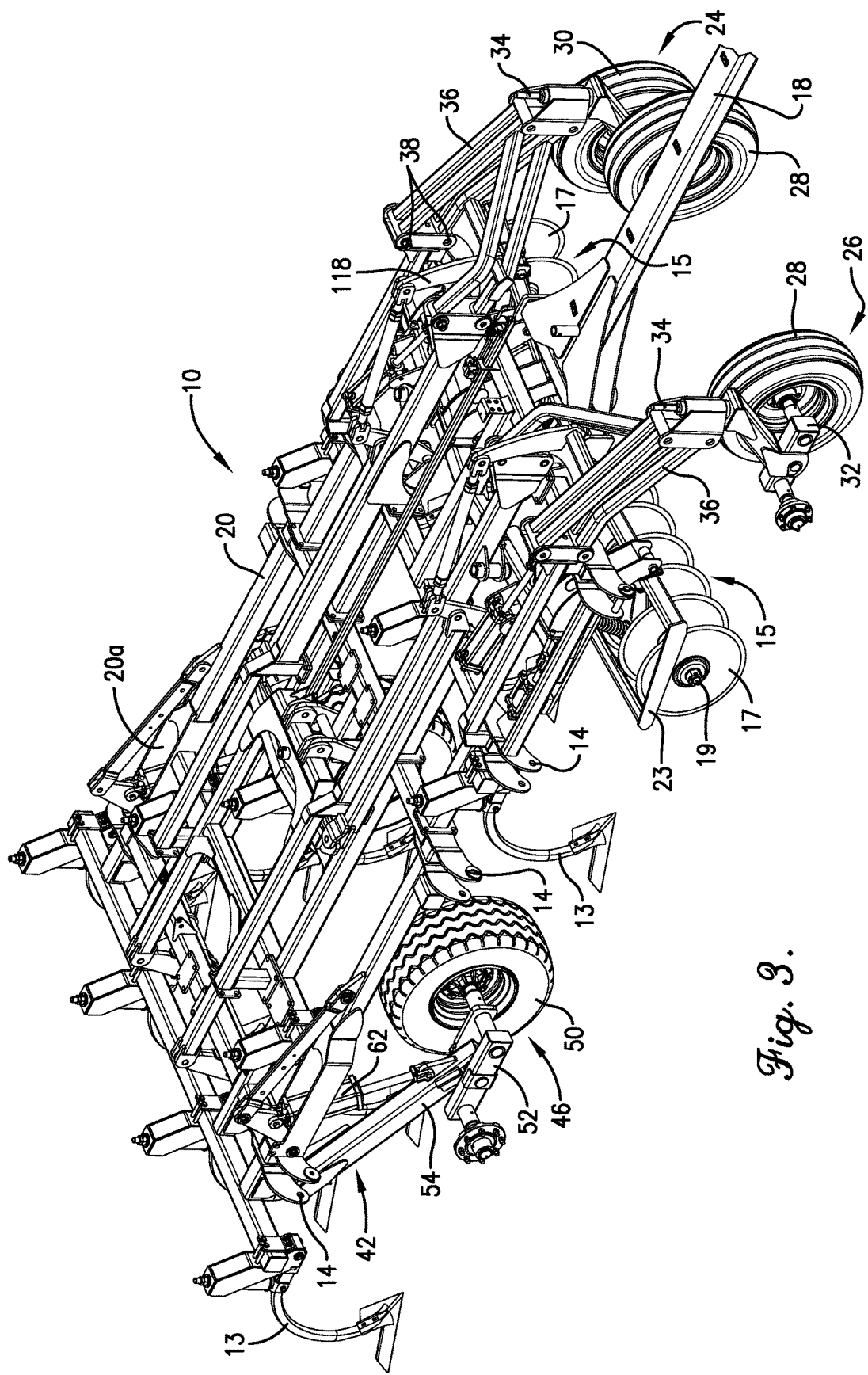
FIG. 3 is a right front isometric view of the center section of the implement, both of the wing sections being removed for clarity, as well as certain of the wheels.
Figure 4:
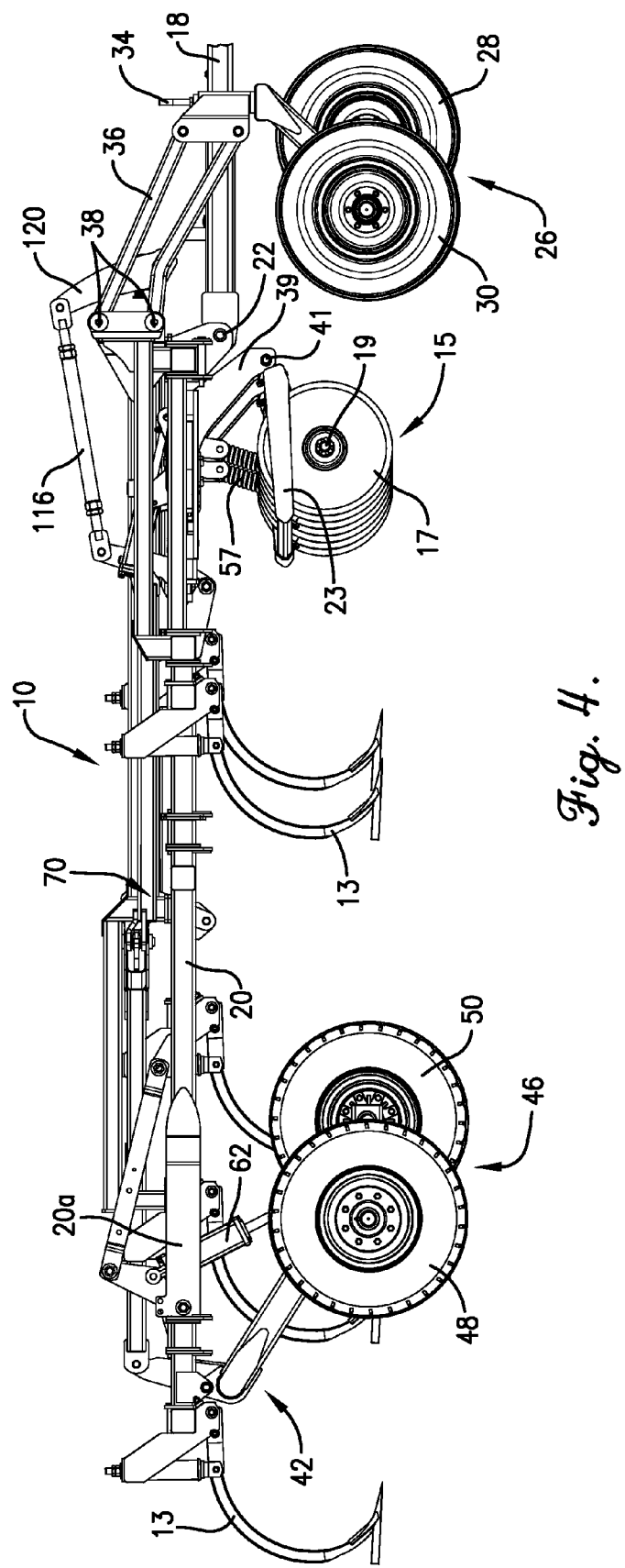
FIG. 4 is a right side elevational view of the center section with the frame in its fully raised, transport position.
Figure 5:
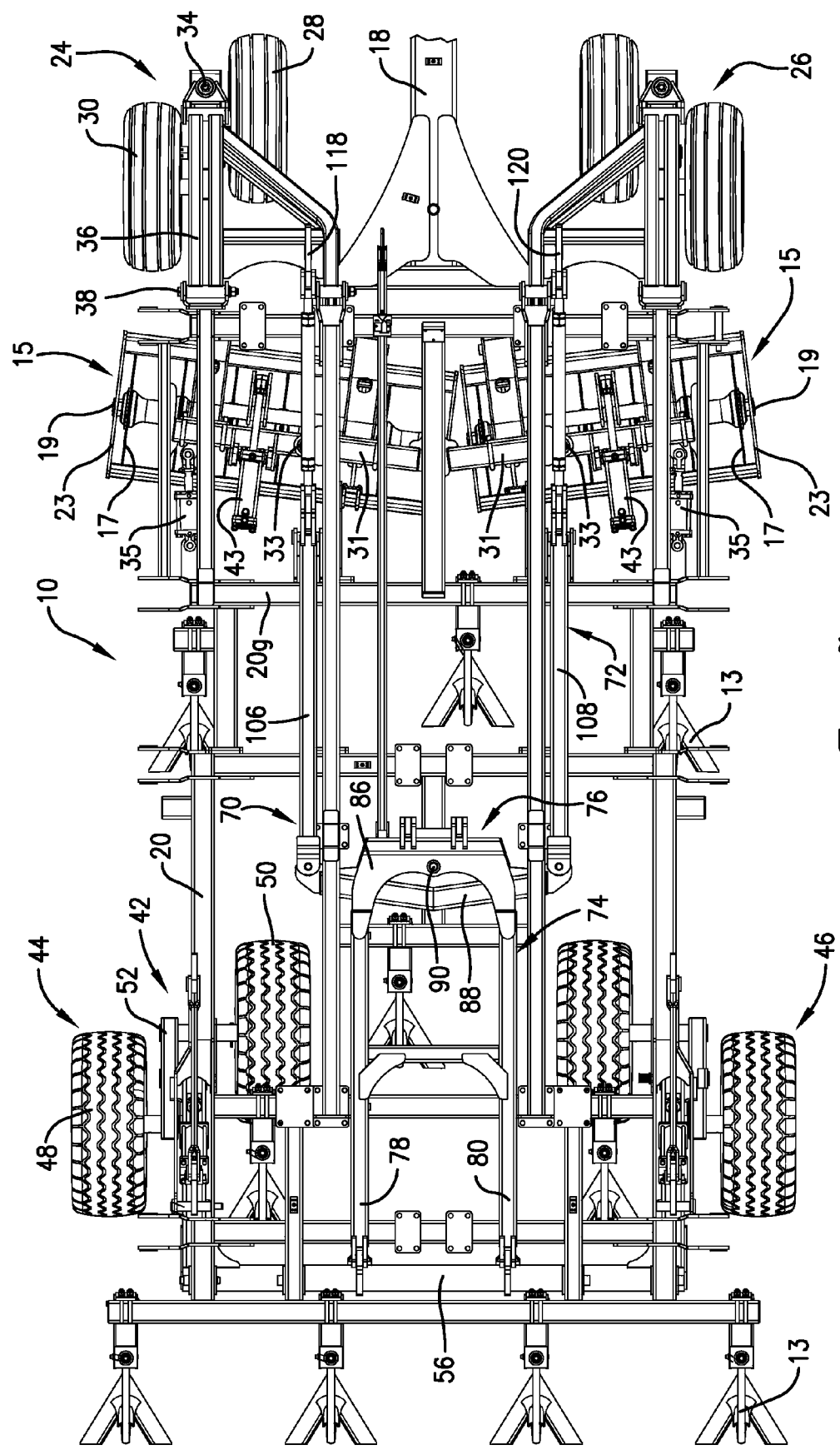
FIG. 5 is a top plan view of the center section with the tongue fragmentarily shown.
Figure 6:
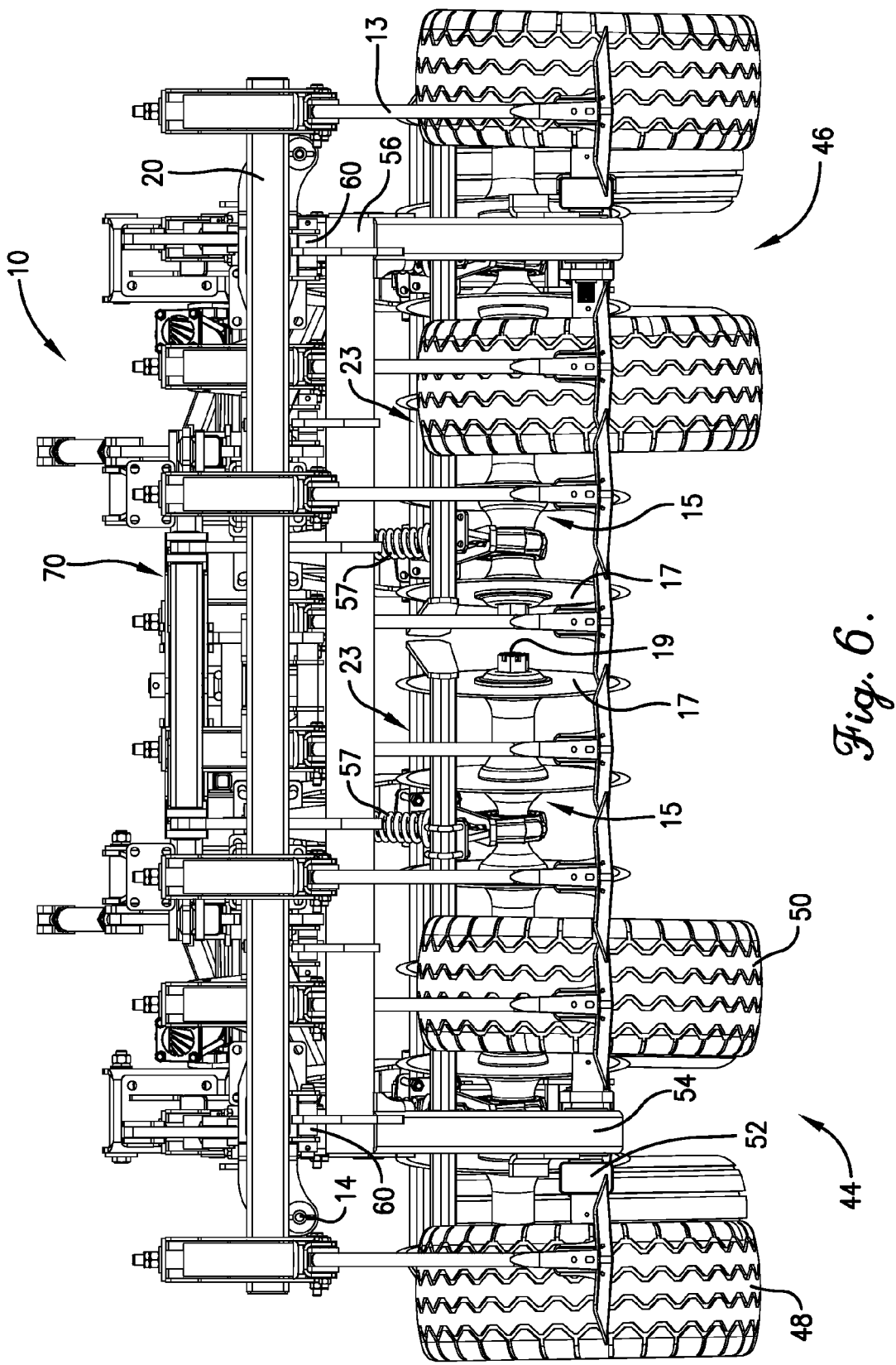
FIG. 6 is a rear elevational view of the center section with the frame in its fully raised, transport position.
Figure 7:
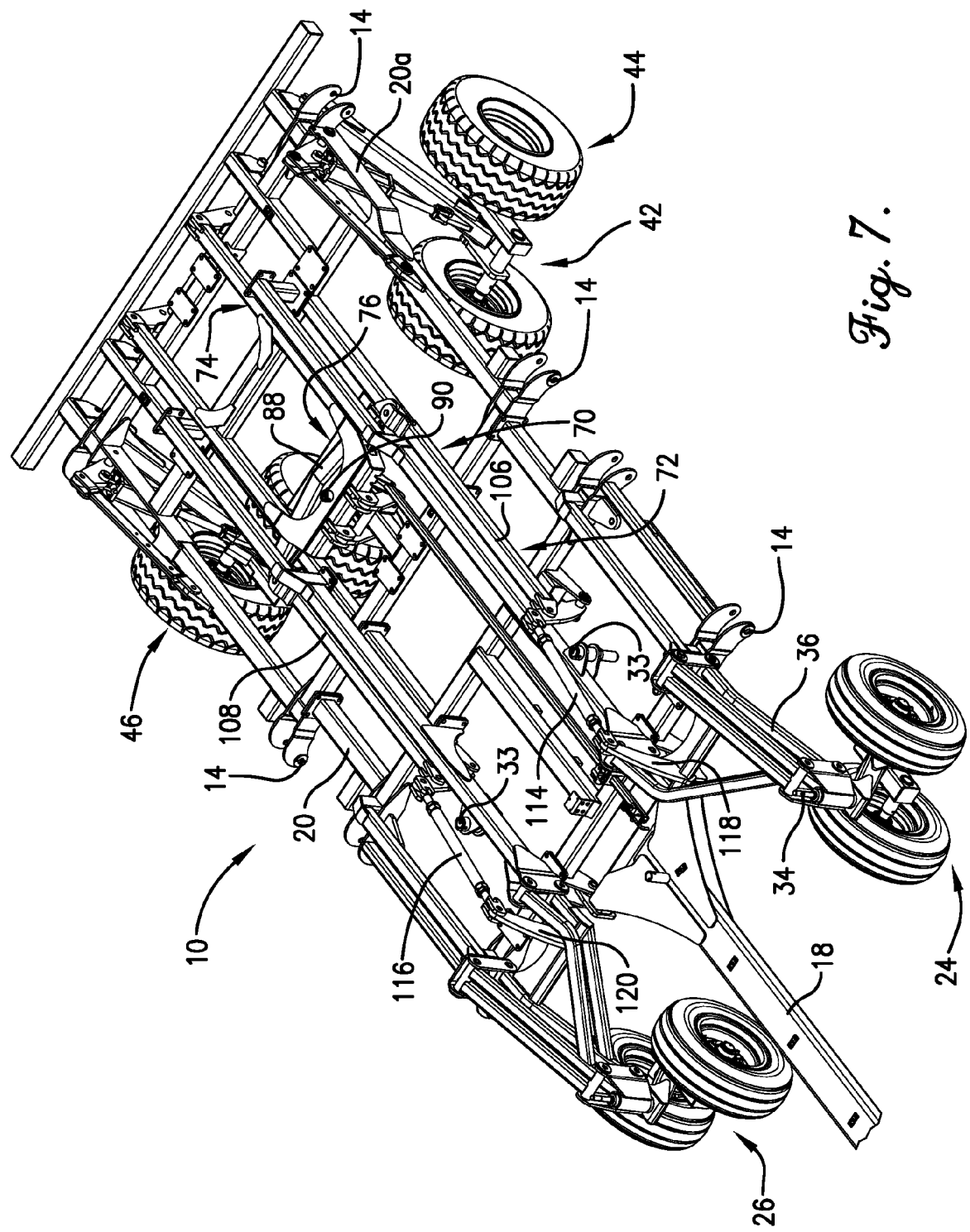
FIG. 7 is a left front isometric view of the center section taken from above the implement and with all blade gangs and shanks removed.
Figure 8:
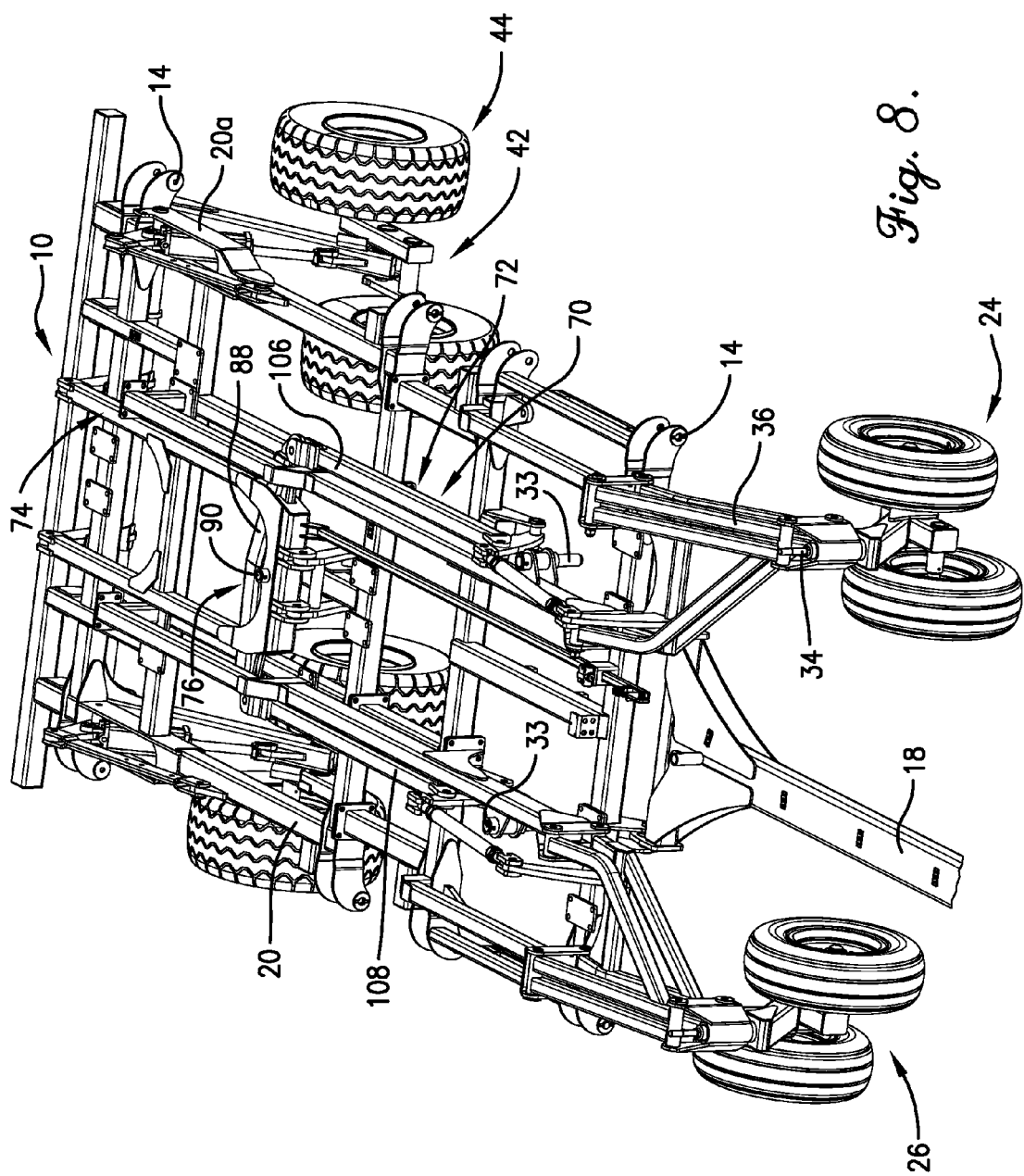
FIG. 8 is a left front isometric view of the center section similar to FIG. 7 but on a larger scale.
Figure 9:
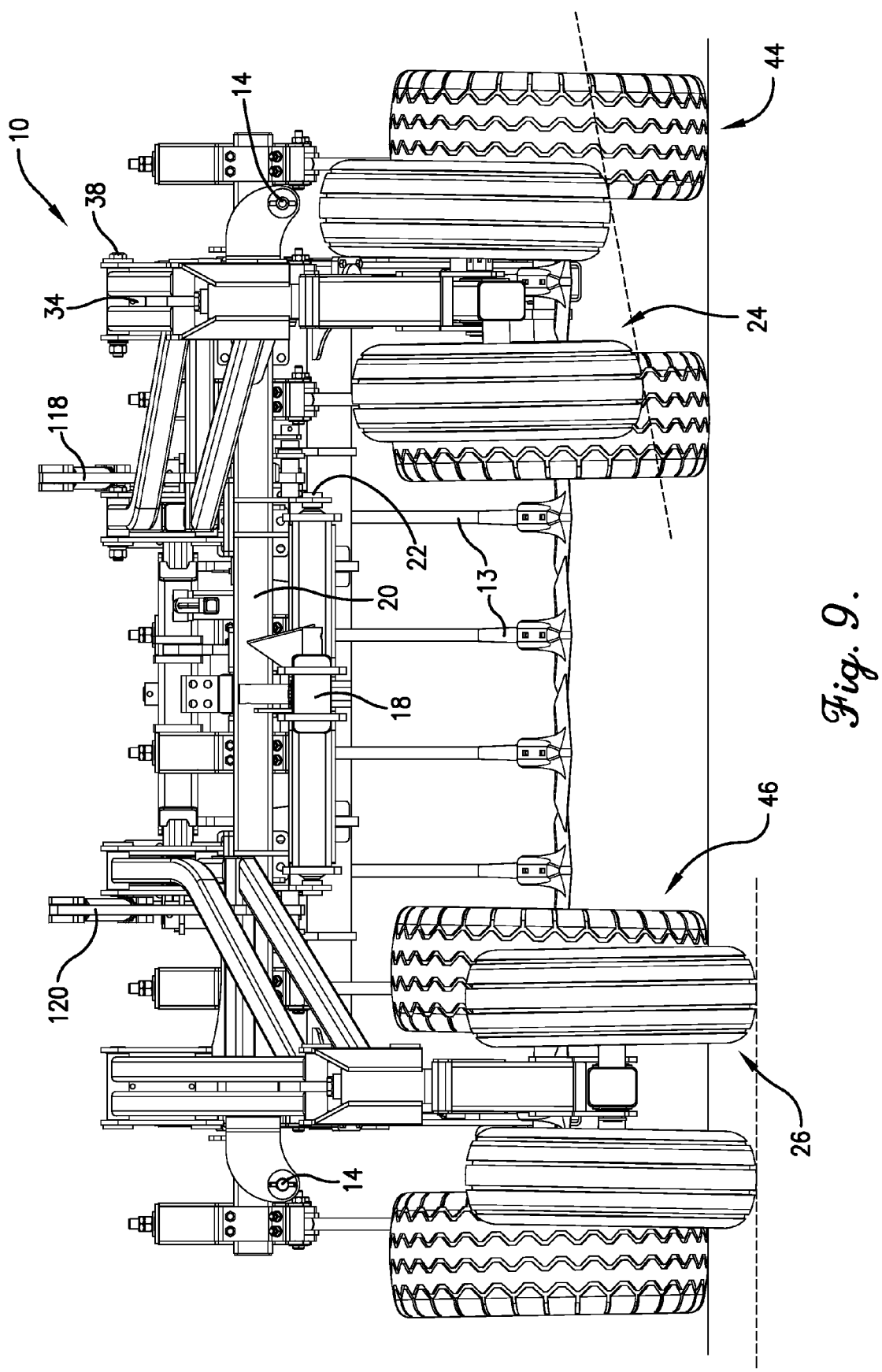
FIG. 9 is an enlarged front elevational view of the center section illustrating the manner in which the front wheels are adapted for non-corresponding up-and-down shifting relative to one another as the terrain varies between the two wheels.
Figure 10:
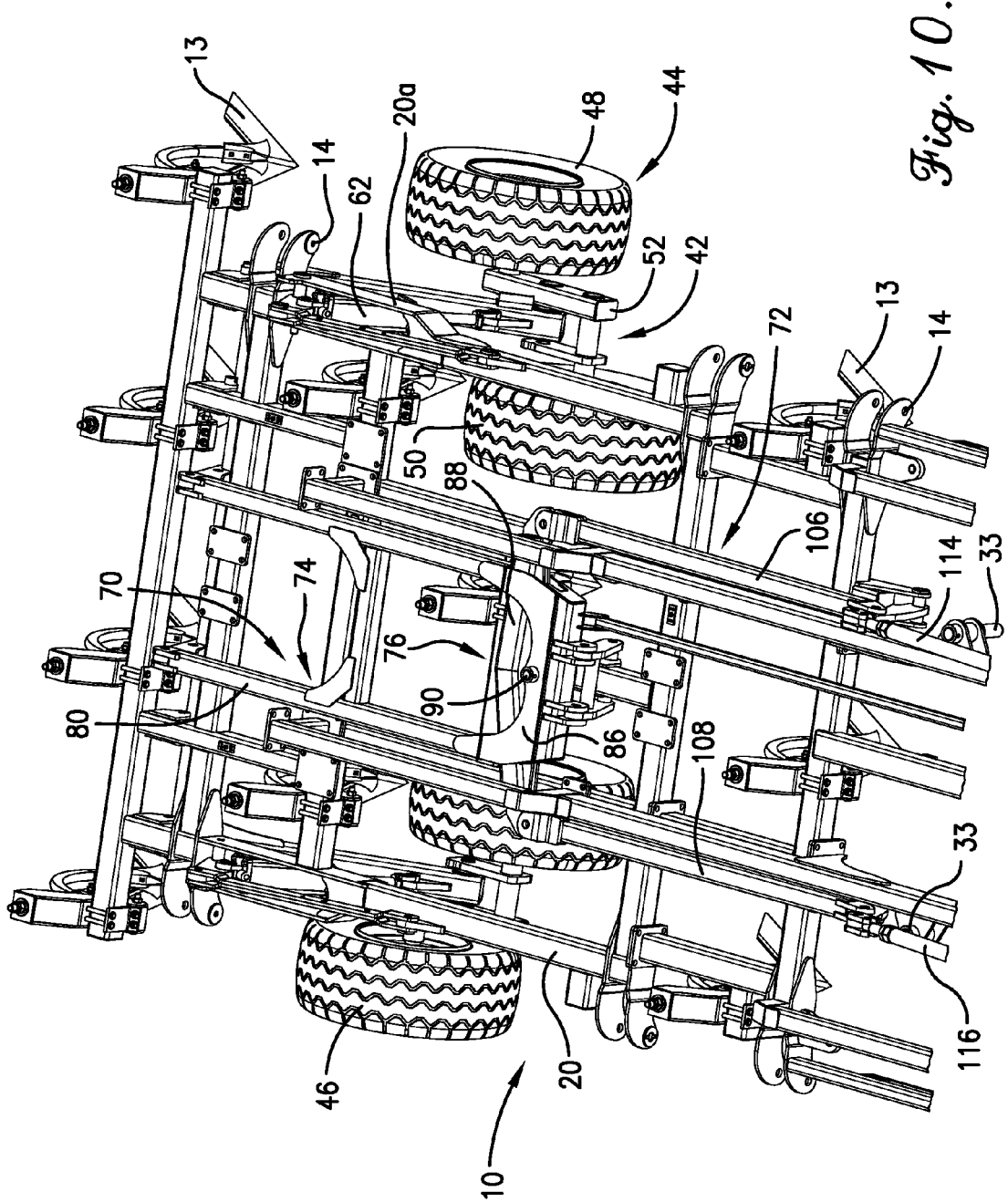
FIG. 10 is a fragmentary top isometric view of the center section corresponding to the condition of things in FIG. 9 and illustrating the way in which the rocker bar pivots to maintain both front wheels engaging the ground and supporting the implement frame.
Figure 11:
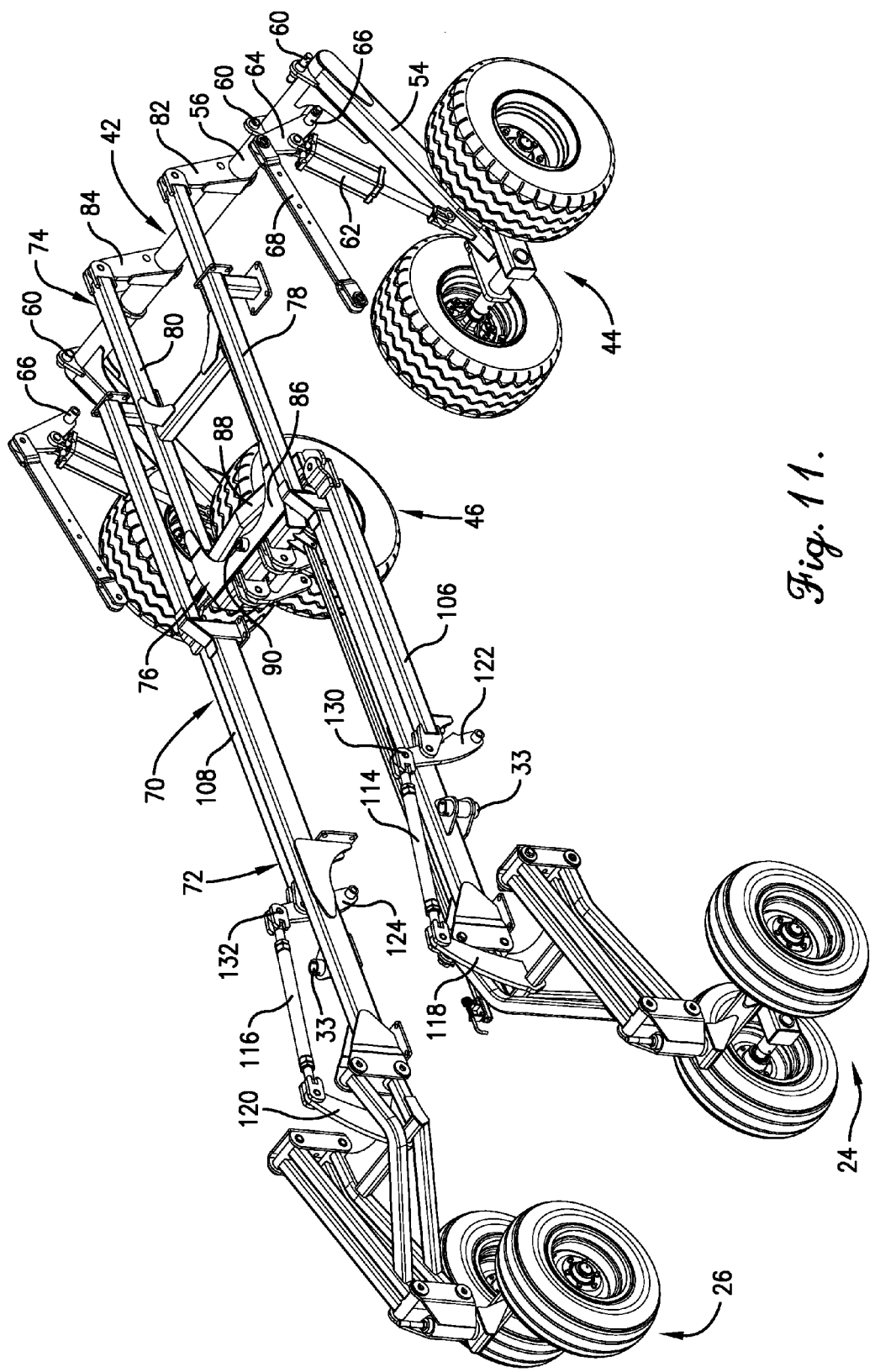
FIG. 11 is a left front isometric view of the center section with portions of the frame and other components removed to illustrate details of the linkage system between the rear lift wheels and front gauge wheels of the machine.
Figure 12:
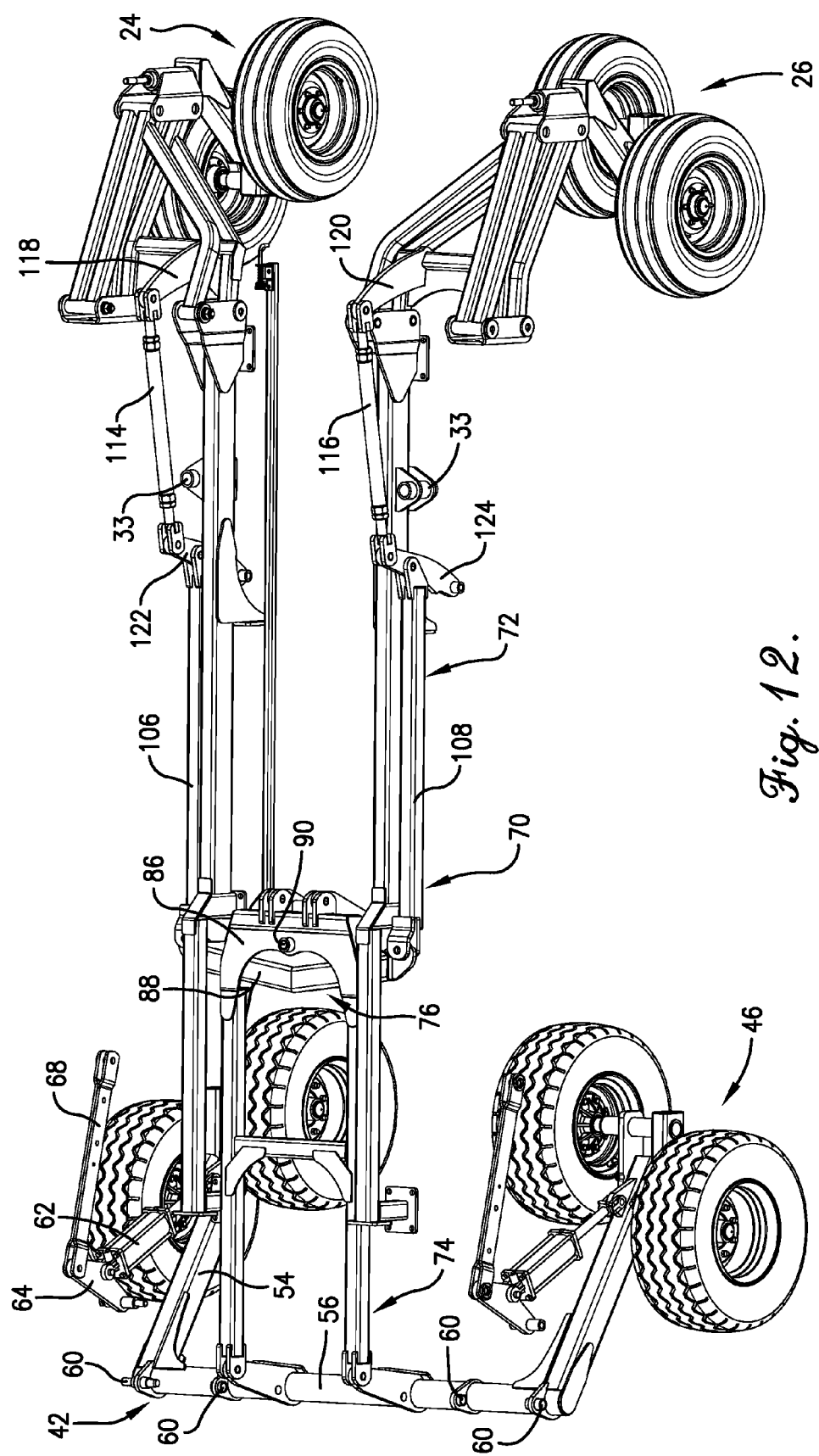
FIG. 12 is a right top isometric view of the center section with parts removed as in FIG. 11.
Figure 13:
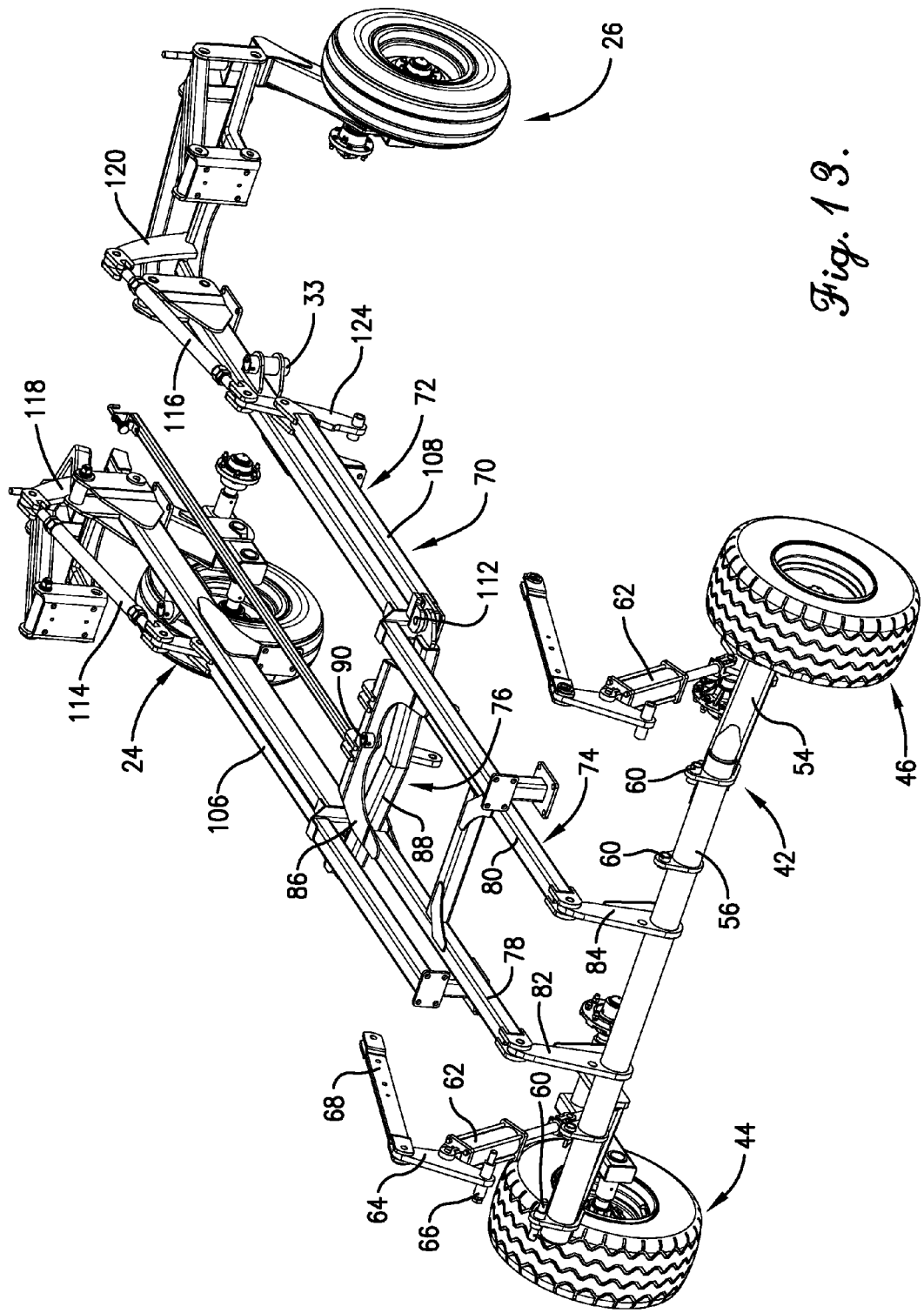
FIG. 13 is a right rear isometric view of the center section with parts removed as in FIGS. 11 and 12.
Figure 14:
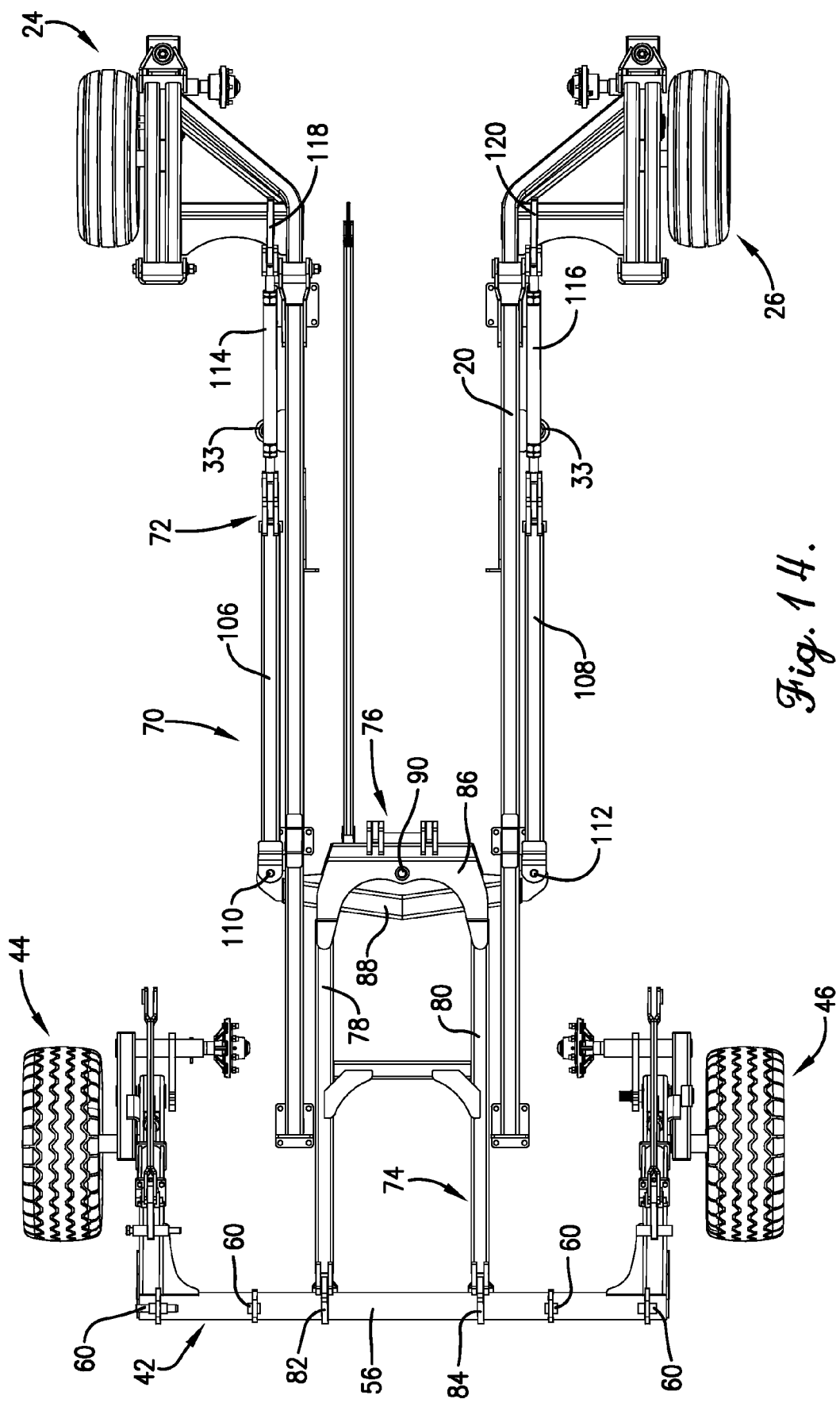
FIG. 14 is a top plan view of the center section with parts removed as in FIGS. 11, 12 and 13, the linkage system being shifted fully forward corresponding to a fully raised condition of the machine.
Figure 15:
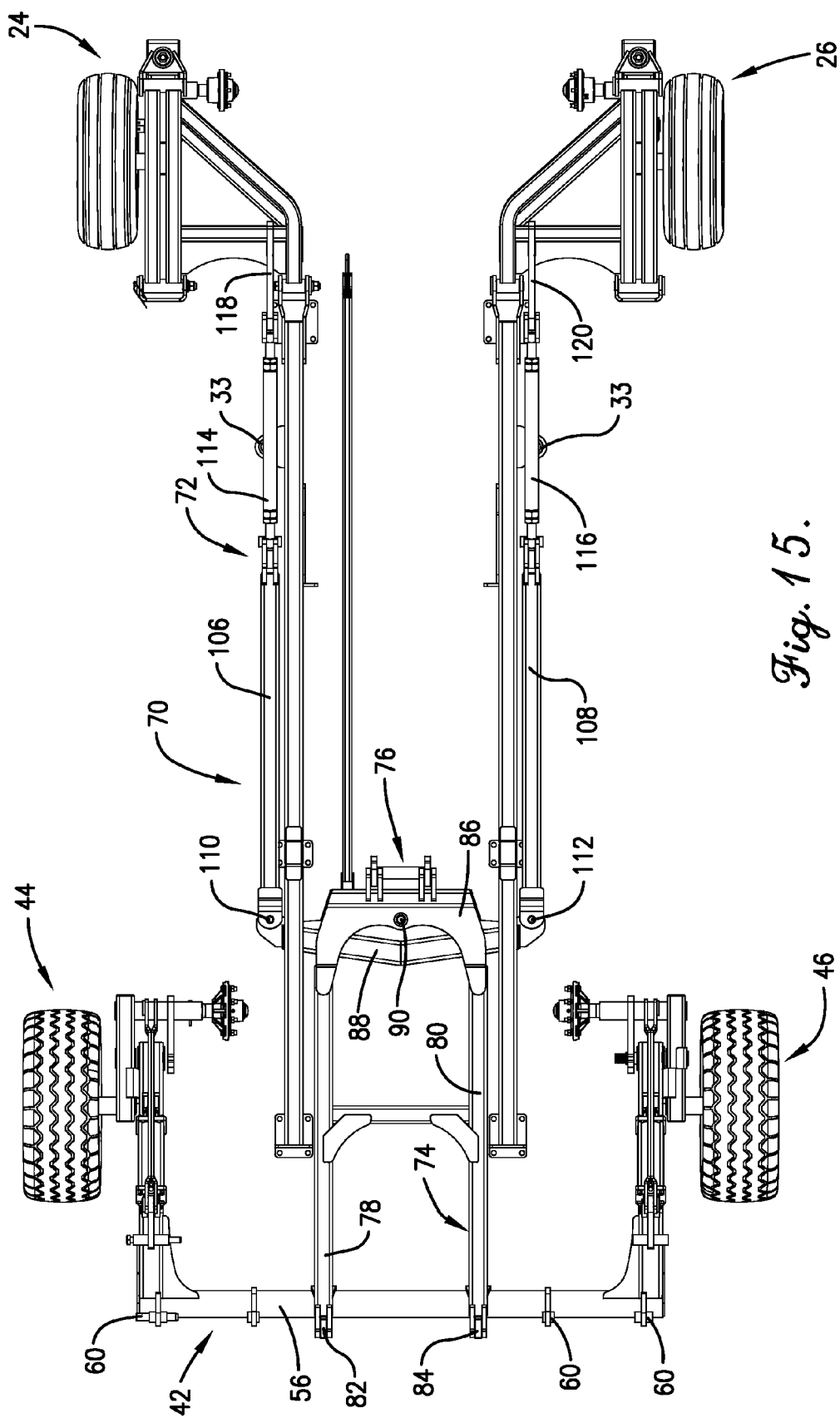
FIG. 15 is a top plan view of the center section similar to FIG. 14 but with the linkage system shifted fully rearward corresponding to a fully lowered condition of the machine.
Figure 16:
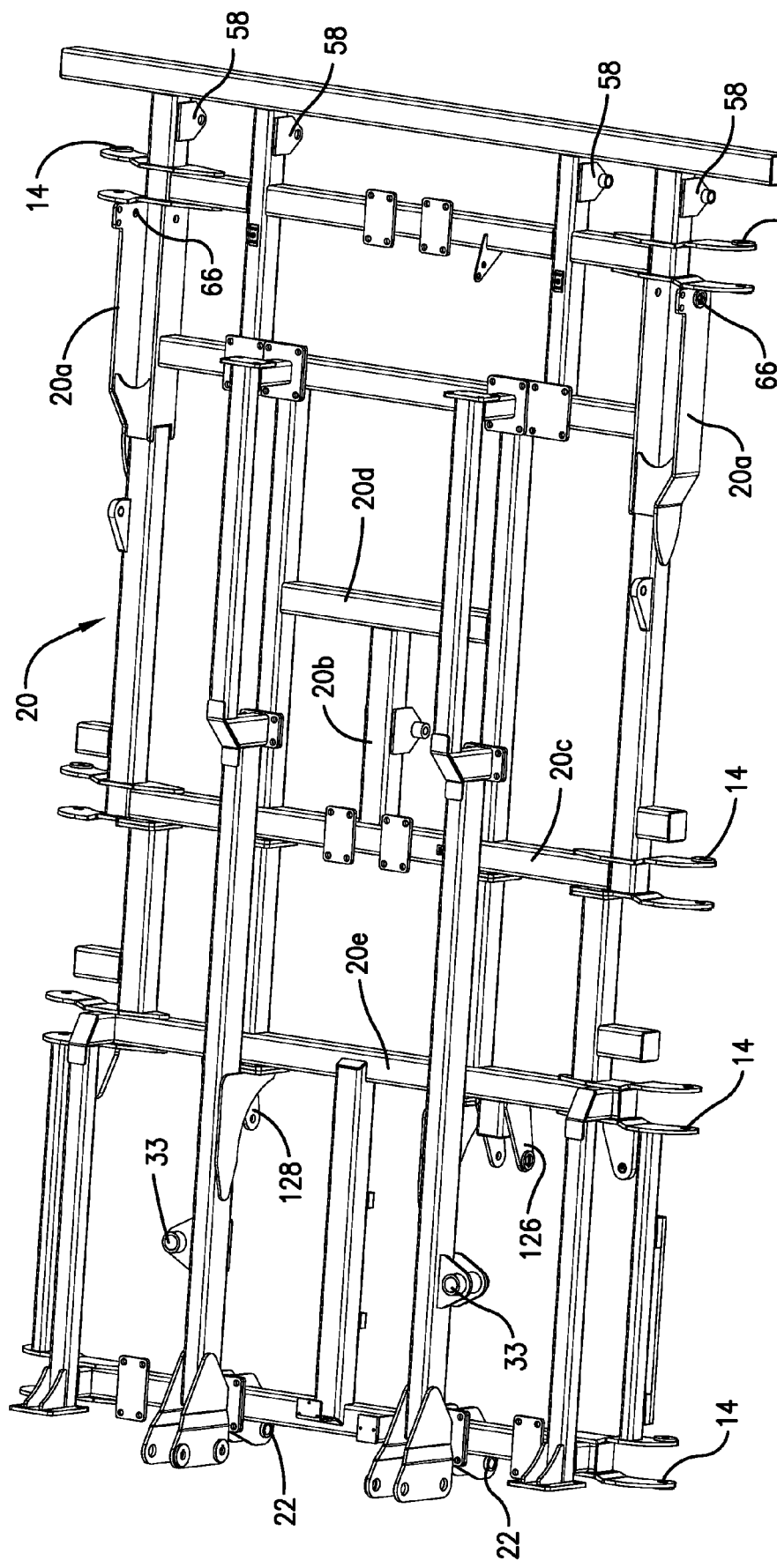
FIG. 16 is a top left isometric view of the frame of the center section.
Figure 17:
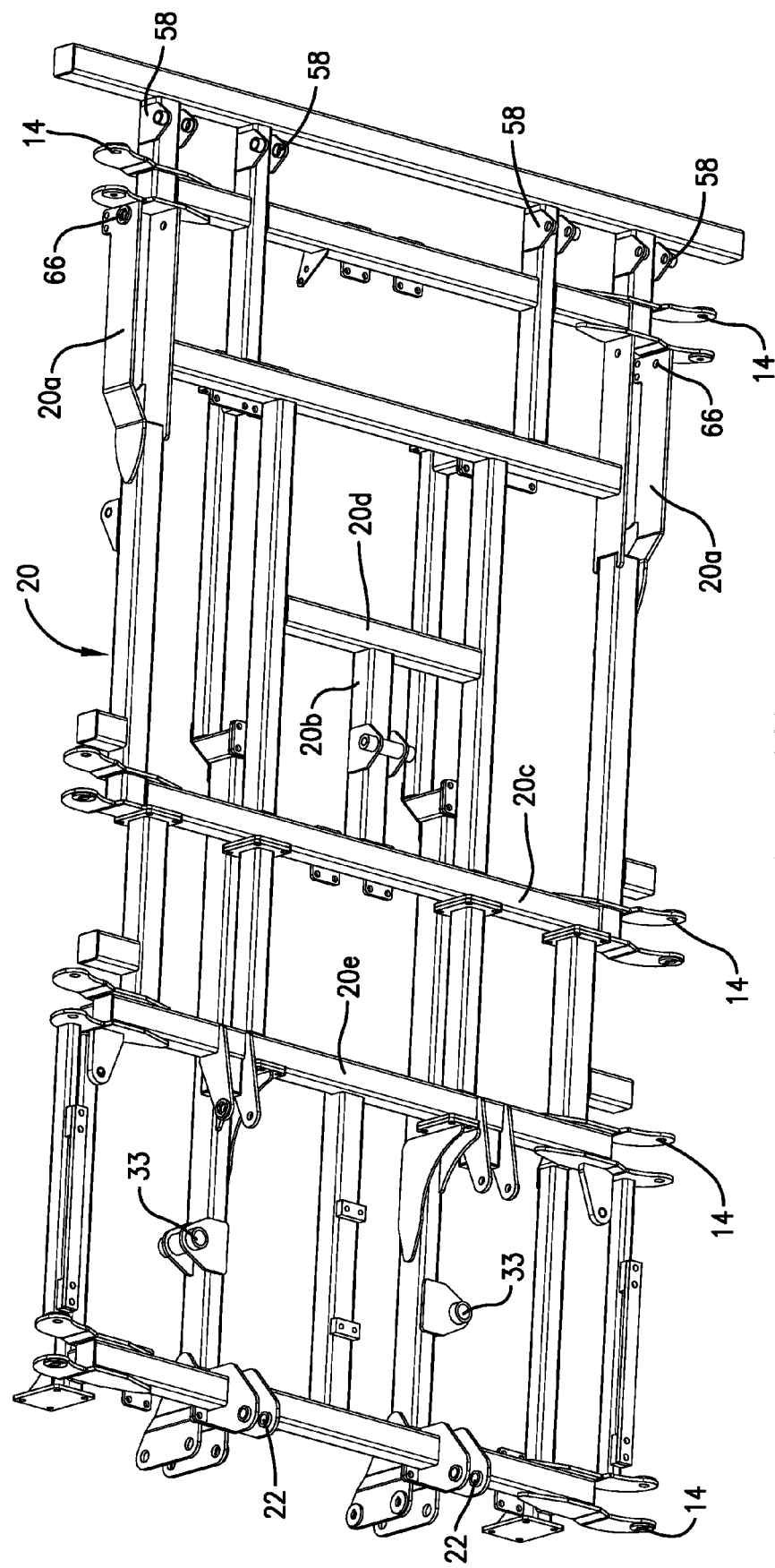
FIG. 17 is a bottom left isometric view of the frame of the center section.
Figure 18:
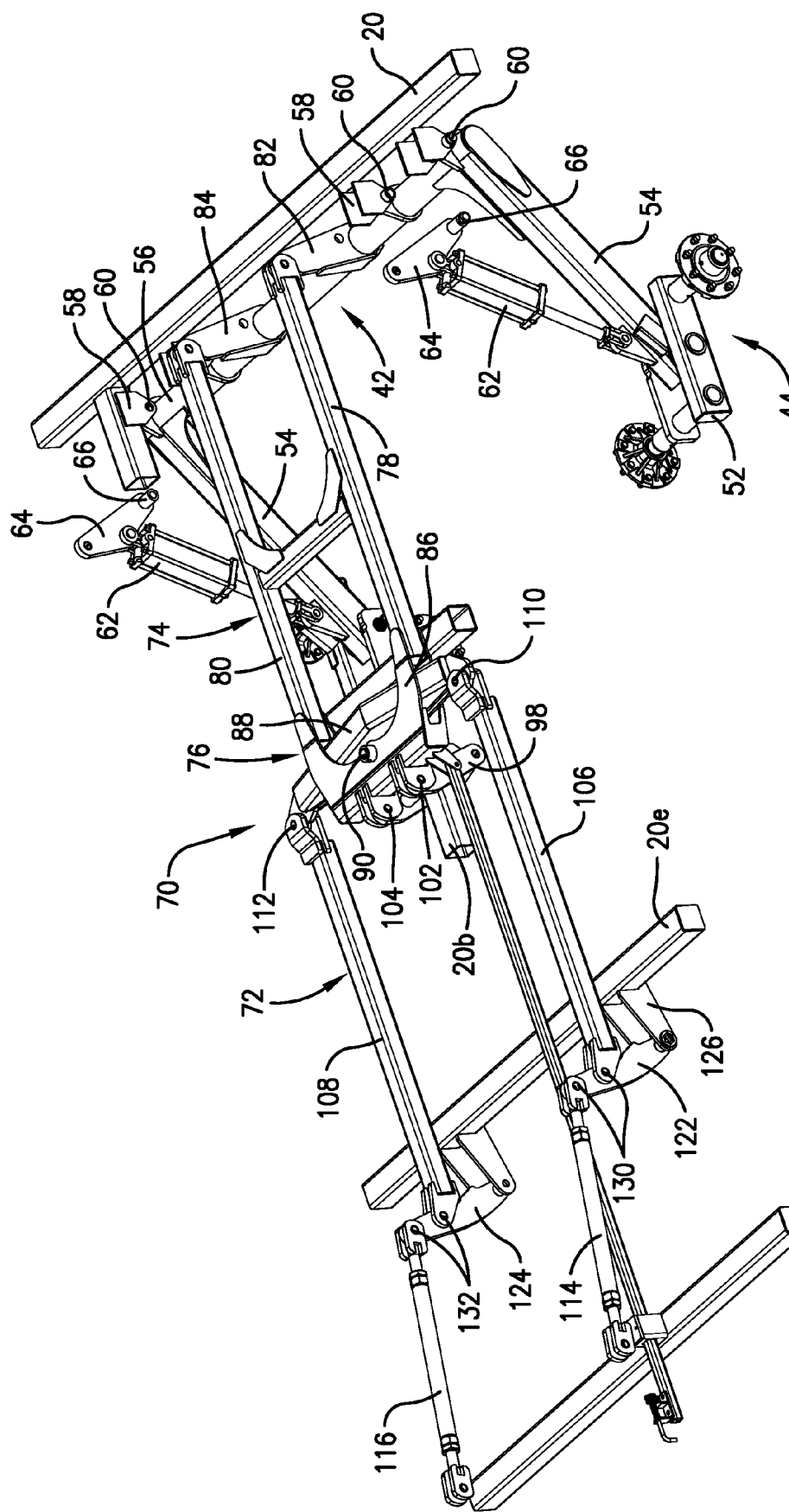
FIG. 18 is a left front isometric view of the linkage system with most of the frame and associated components removed to reveal details of construction of the linkage system.
Figure 19:
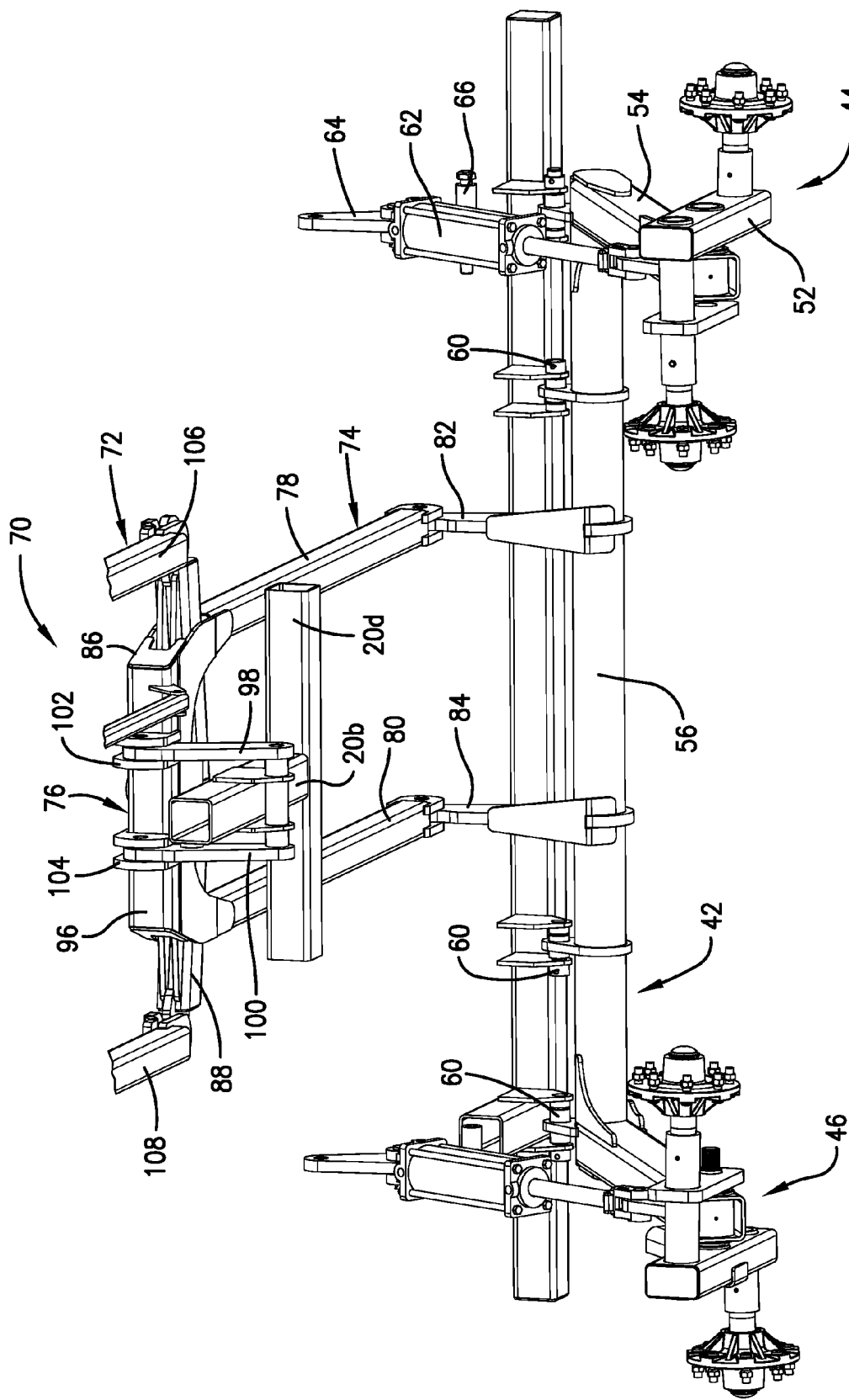
FIG. 19 is a fragmentary, left bottom isometric view of the linkage system with most of the frame and associated components removed as in FIG. 18.
Figure 20:
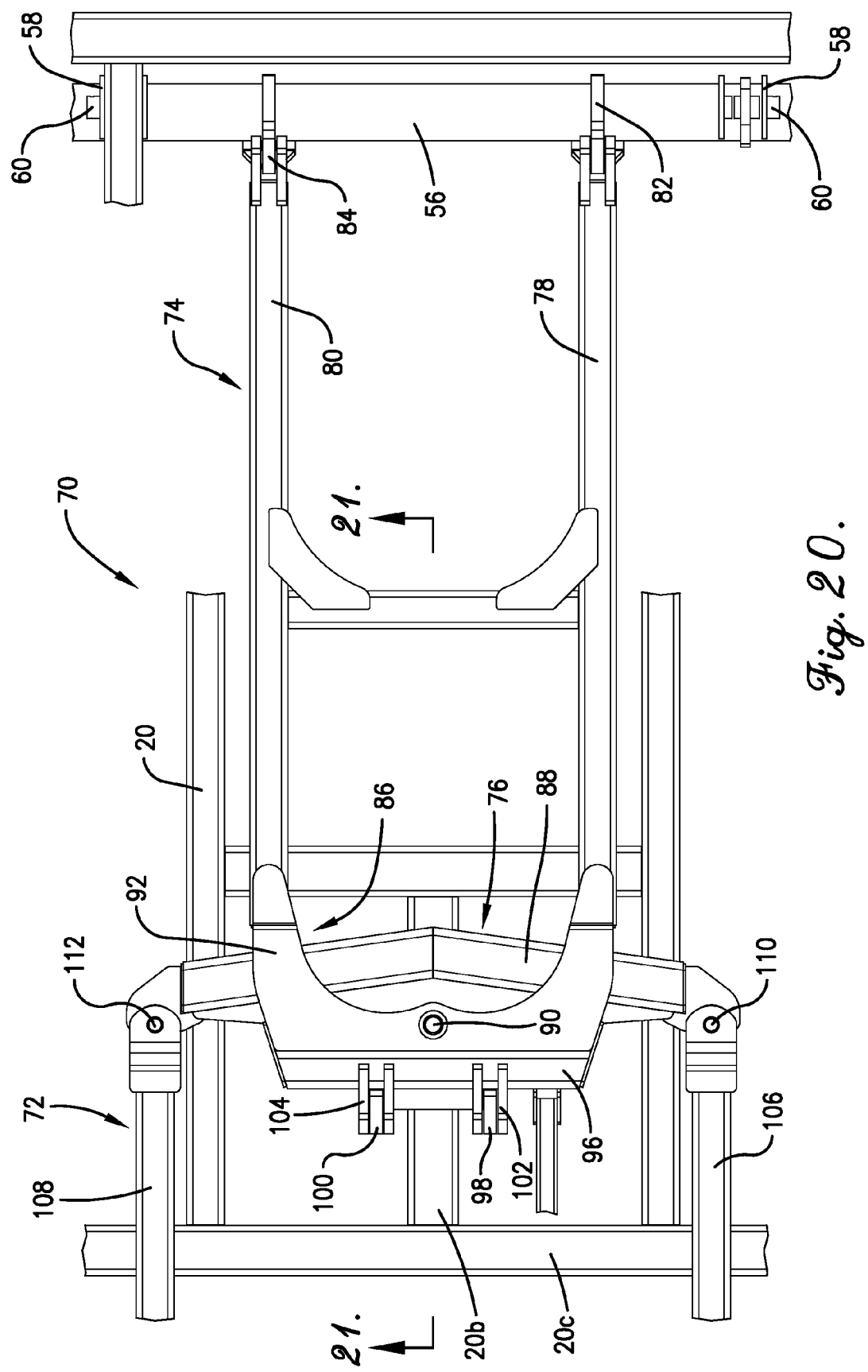
FIG. 20 is an enlarged, fragmentary top plan view of the linkage system with most of the frame and associated components removed as in FIGS. 18 and 19.
Figure 21:
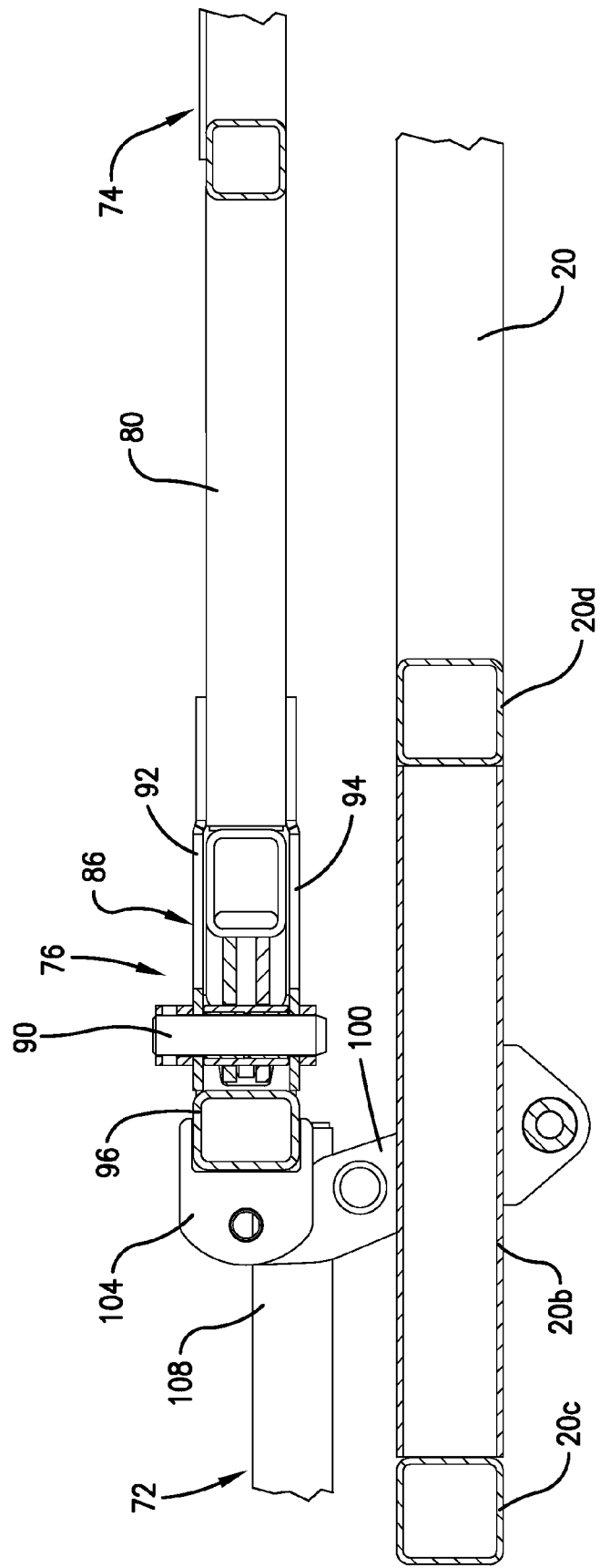
FIG. 21 is a fragmentary, fore-and-aft, vertical cross-sectional view through the linkage system taken substantially along line 21-21 of FIG. 20.
Figure 22:
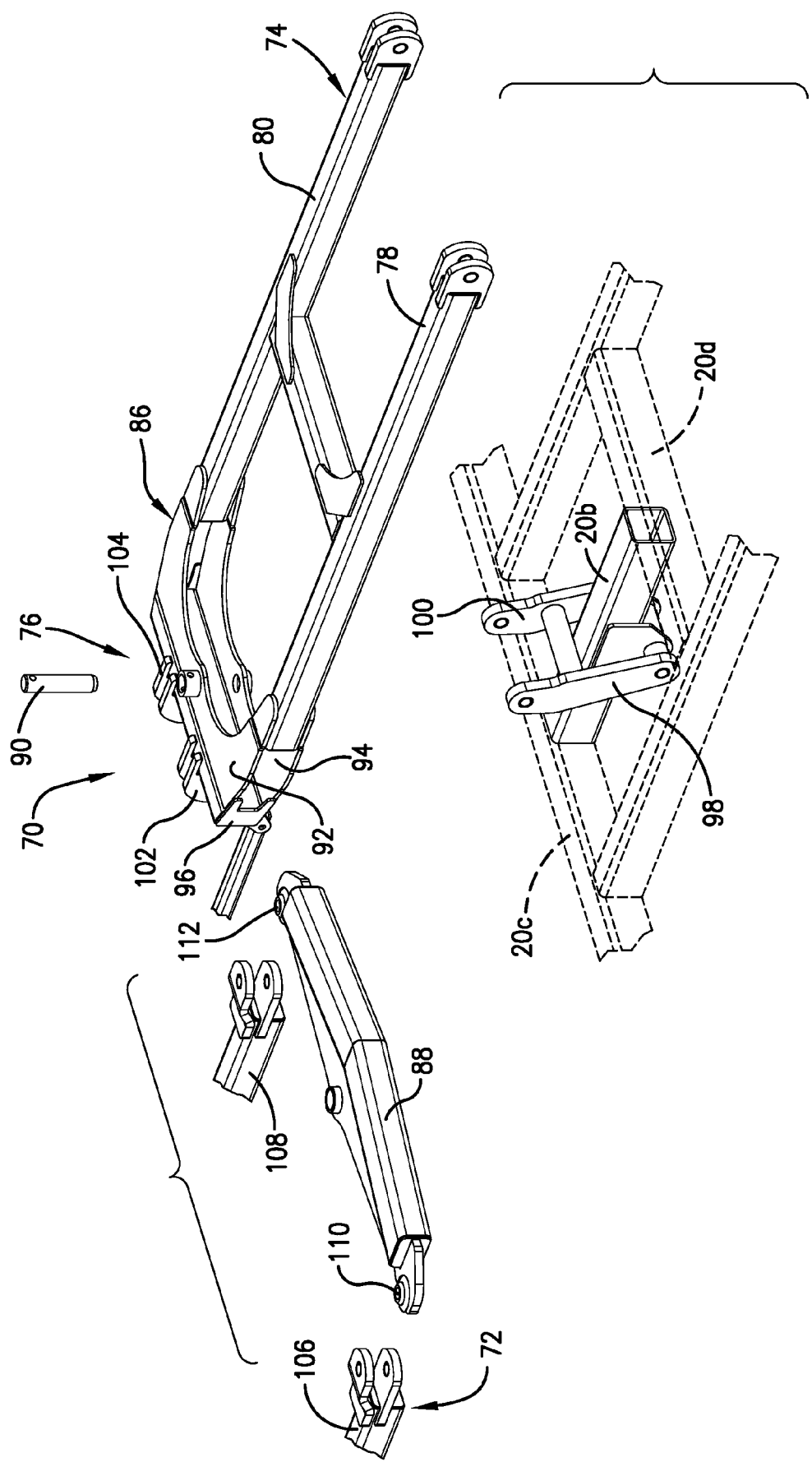
FIG. 22 is an exploded, fragmentary, rear isometric view of the rocker coupling between the front and rear linkages of the linkage system.
Figure 23:
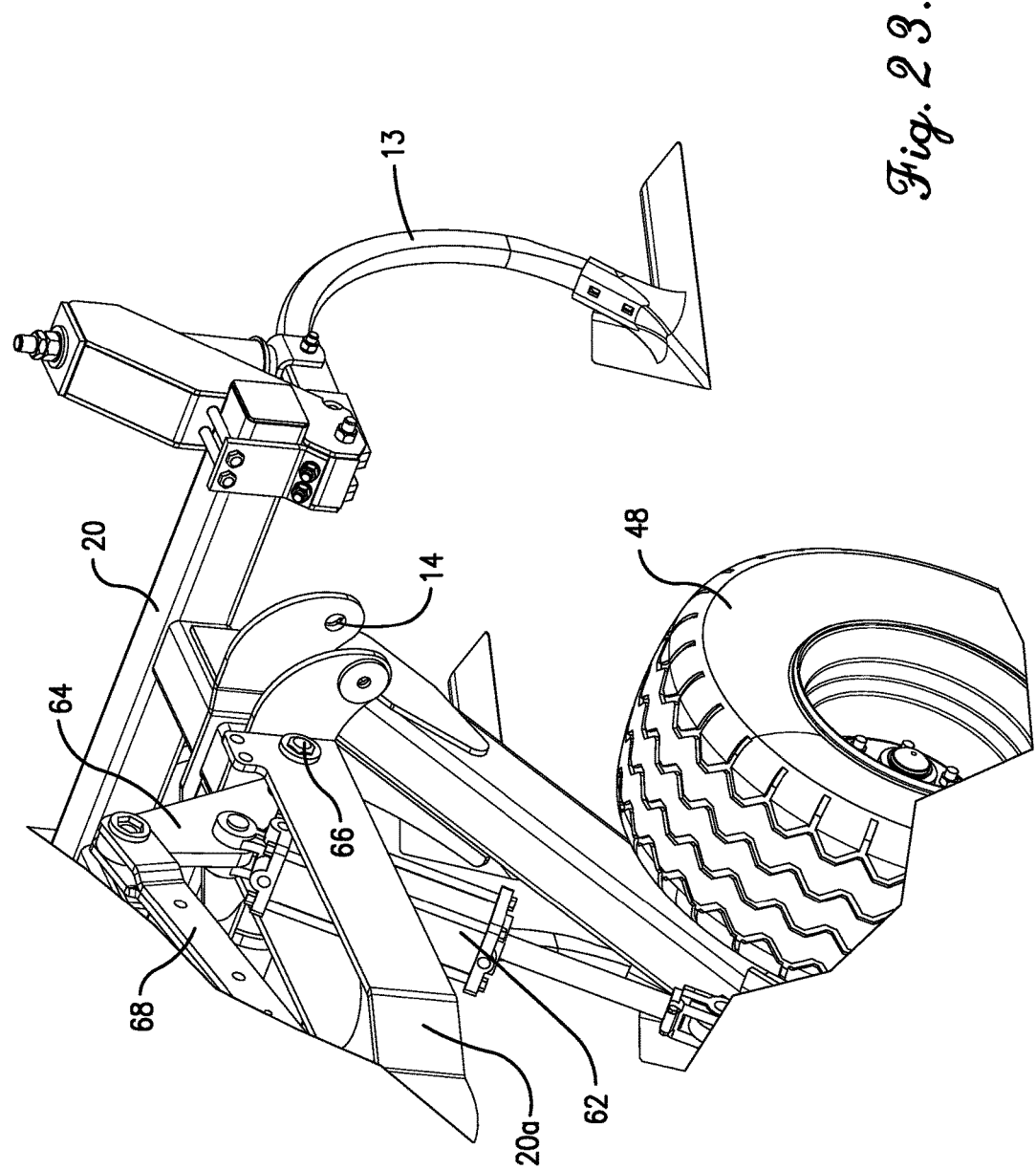
FIG. 23 is an enlarged, fragmentary, left front isometric view of the left rear corner of the center section illustrating an exemplary one of the multiple tillage tools (shanks with sweeps) carried by the machine.
Figure 24:
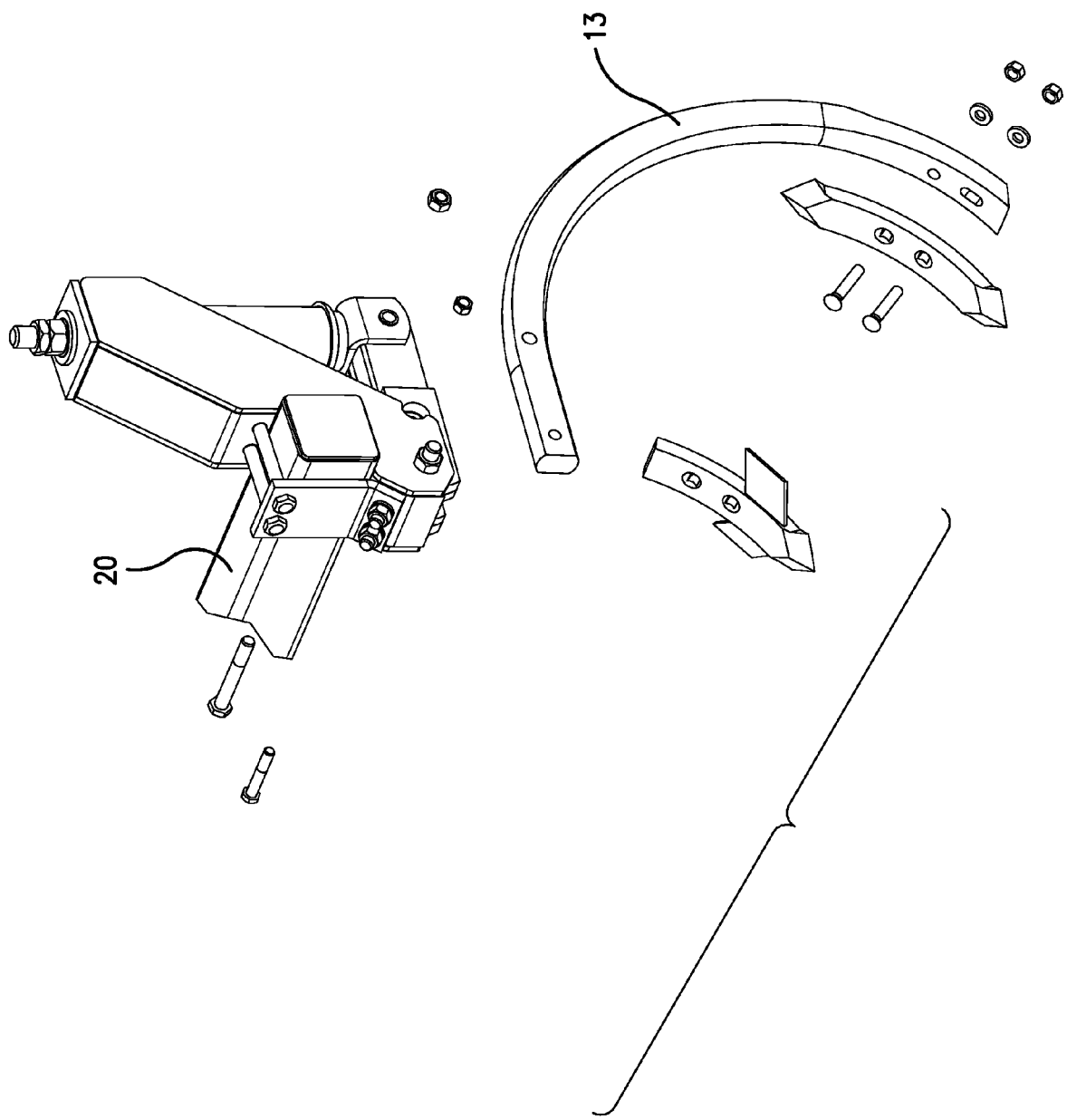
FIG. 24 is a fragmentary, exploded front isometric view of another form of tillage tool (shanks with replaceable straight or winged chisel points) that could be carried by the machine.
Figure 25:
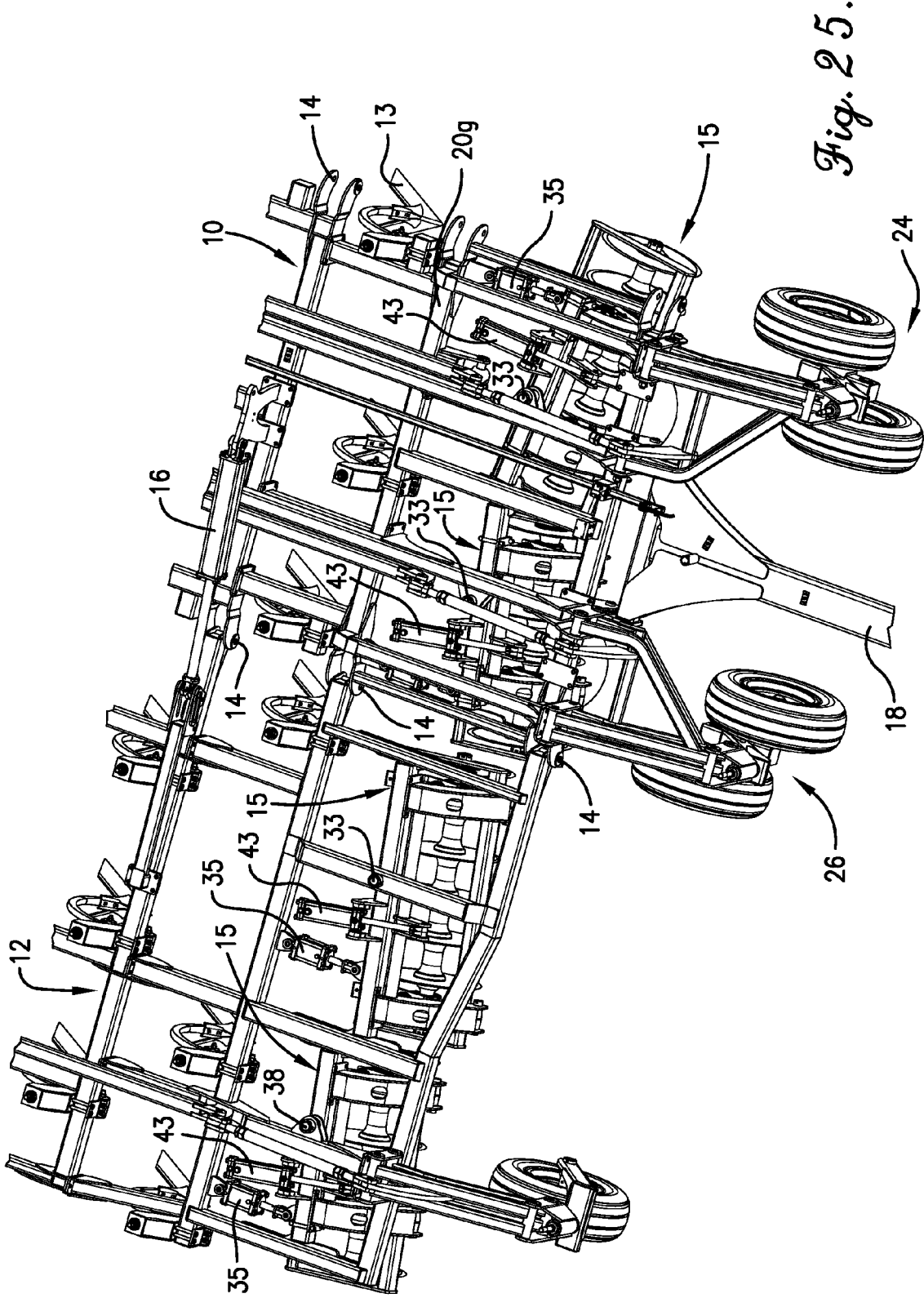
FIG. 25 is a fragmentary, top left, front isometric view of the implement similar to FIG. 1 but taken more directly above the implement and with the rear half of the machine broken away.
Figure 26:
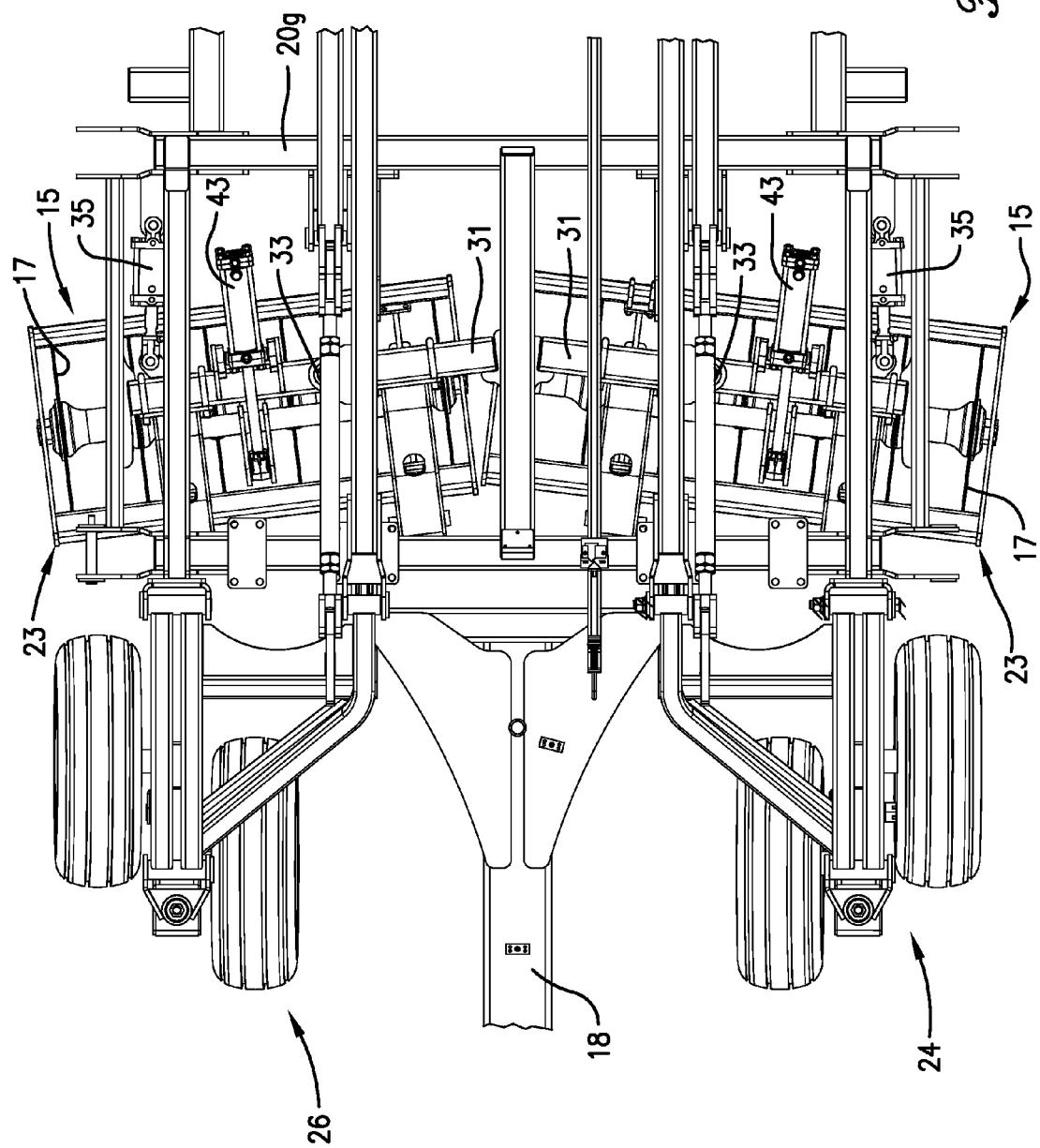
FIG. 26 is a fragmentary, top plan view of the front of the center section illustrating the two end-to-end blade gangs of the center section angled in a manner to converge rearwardly as the imaginary center line of the implement is approached.
Figure 27:
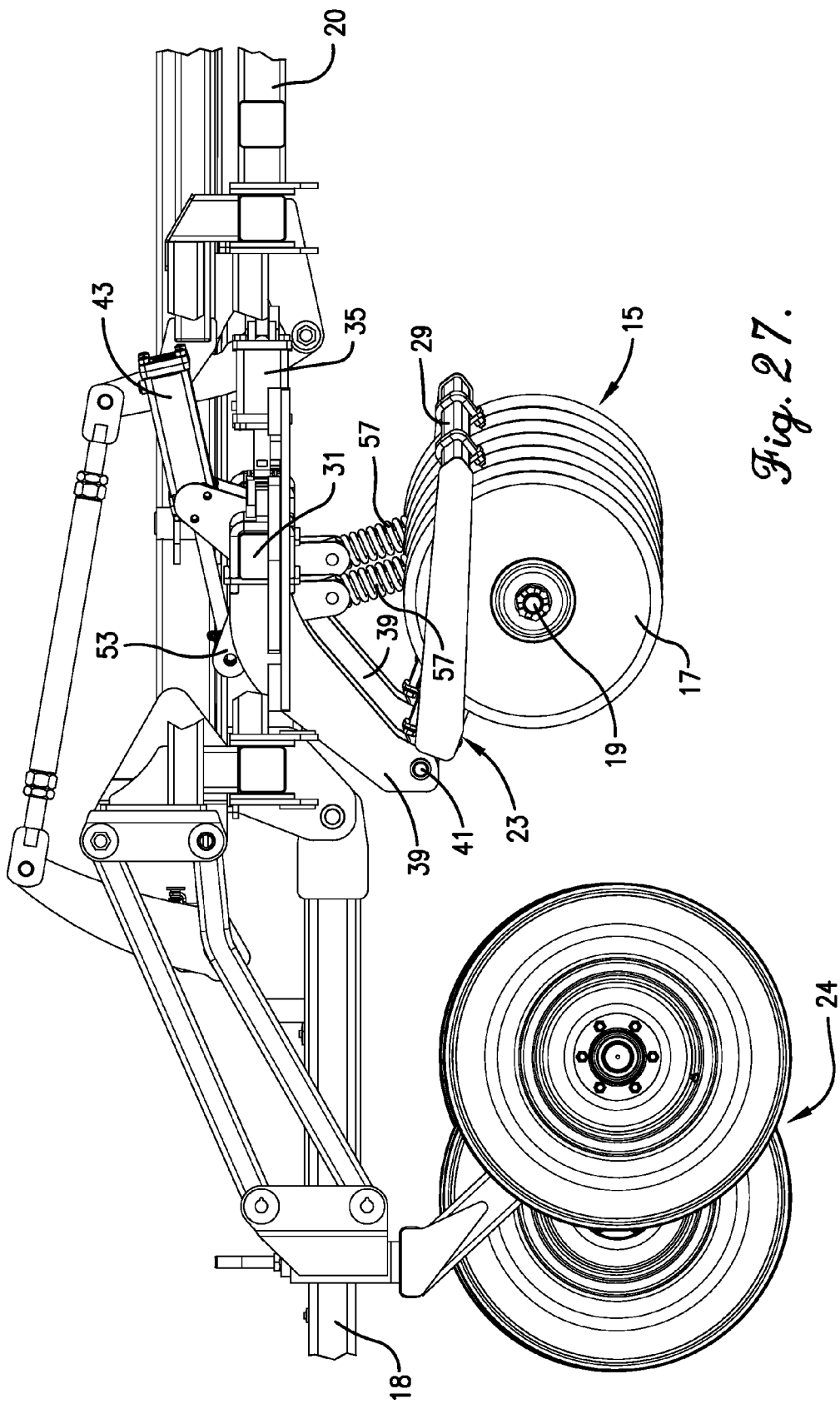
FIG. 27 is a fragmentary, left side elevational view of the center section illustrating the main frame in its fully raised transport position and the blade gangs in their fully adjustably lowered position relative to the main frame.
Figure 28:
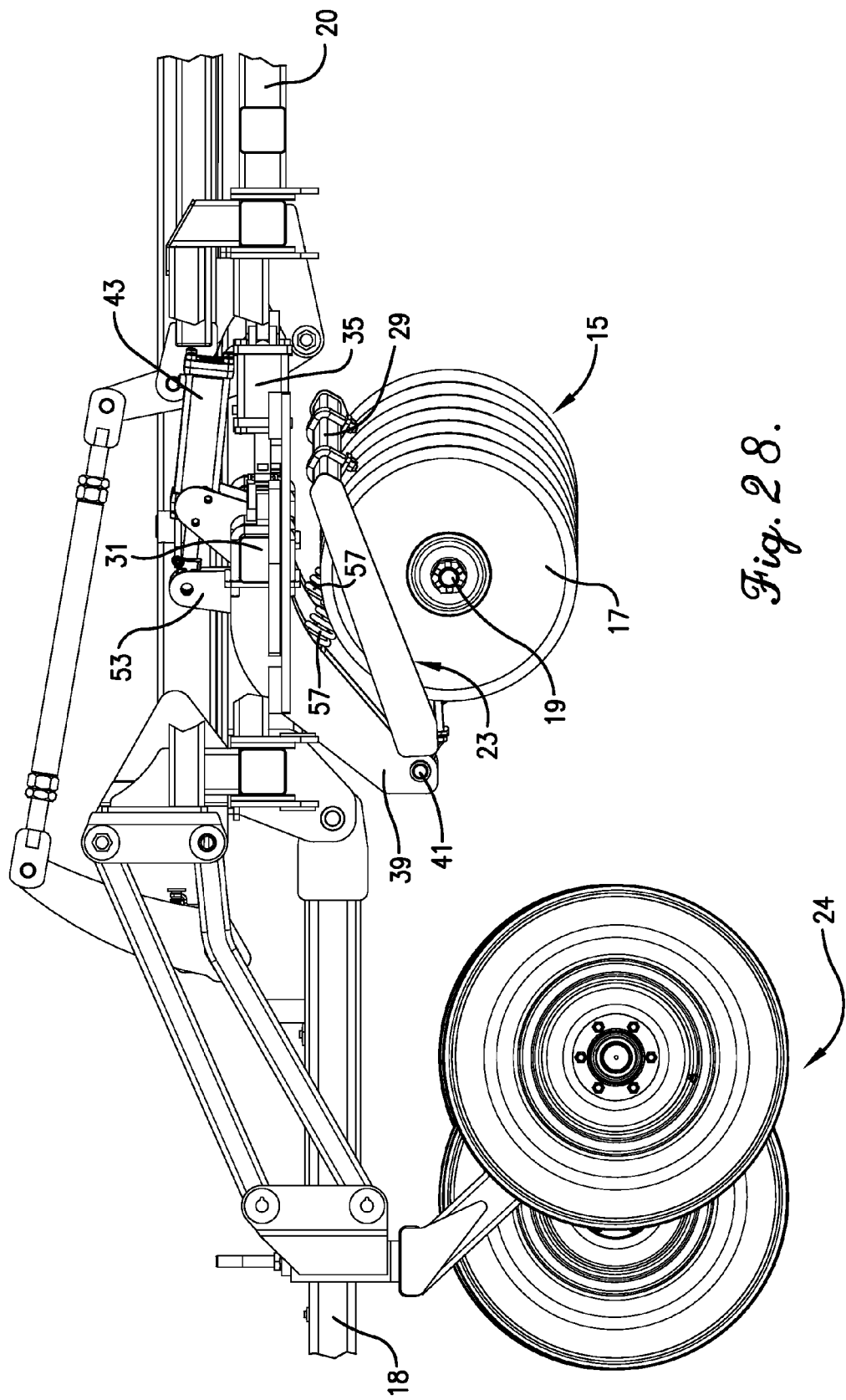
FIG. 28 is a fragmentary, left side elevational view of the center section similar to FIG. 27 but with the blade gangs in their fully adjustably raised position.
Figure 29:
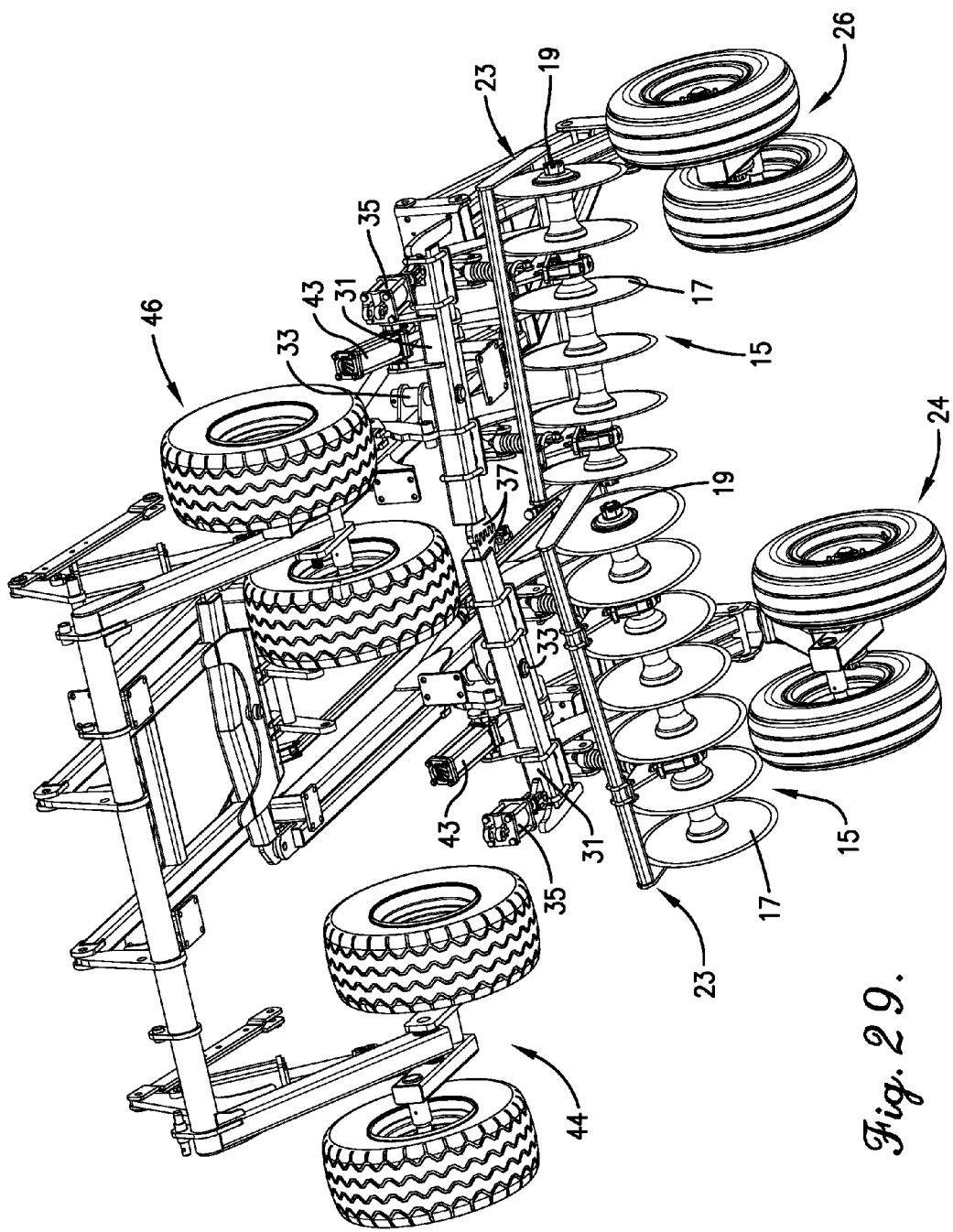
FIG. 29 is a bottom, right, rear isometric view of the center section with the tillage shanks and much of the main frame removed to reveal details of the blade gangs.
Figure 30:
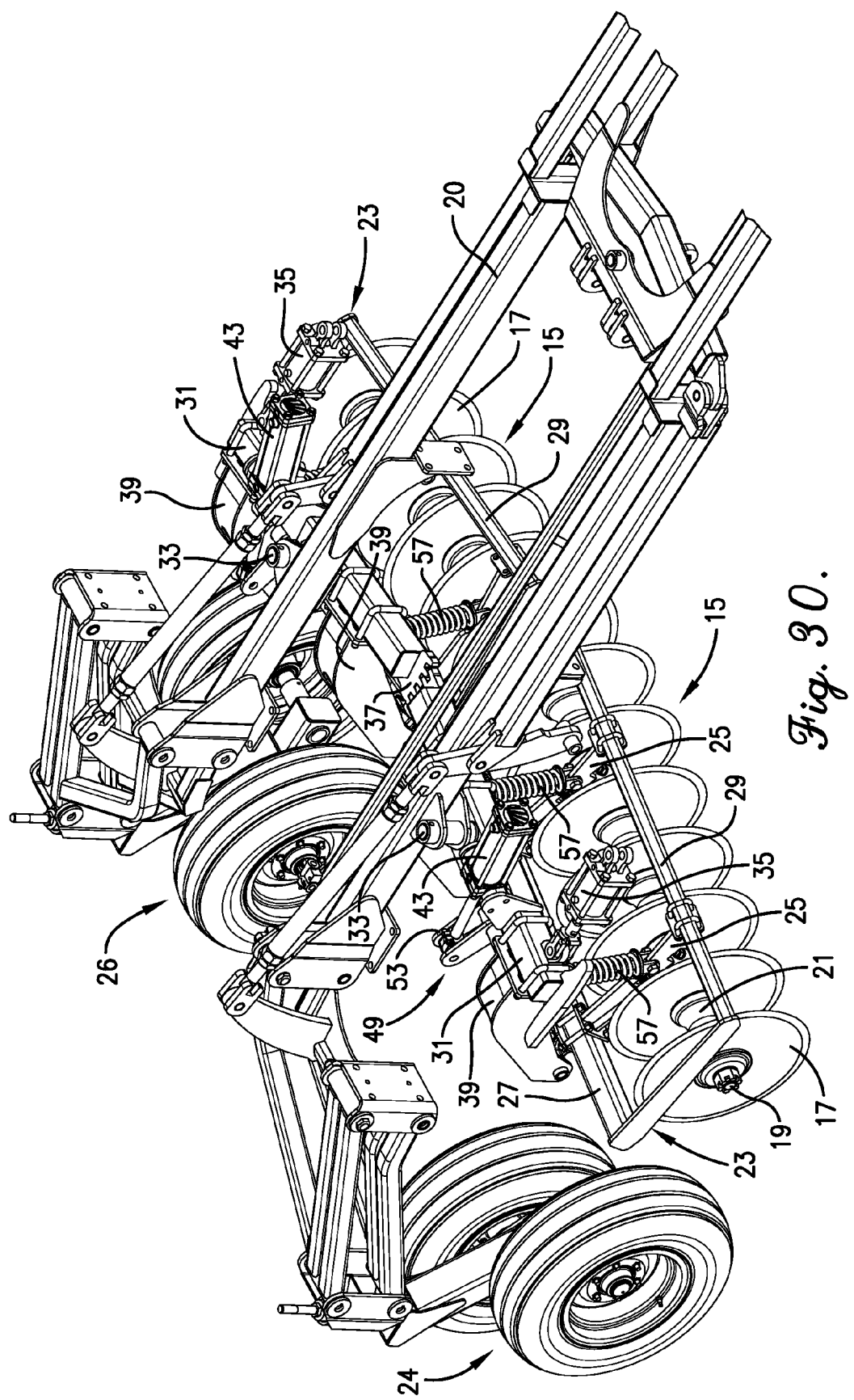
FIG. 30 is a fragmentary, left rear isometric view of the center section with the tillage shanks and much of the main frame removed to reveal details of the blade gangs.
Figure 31:
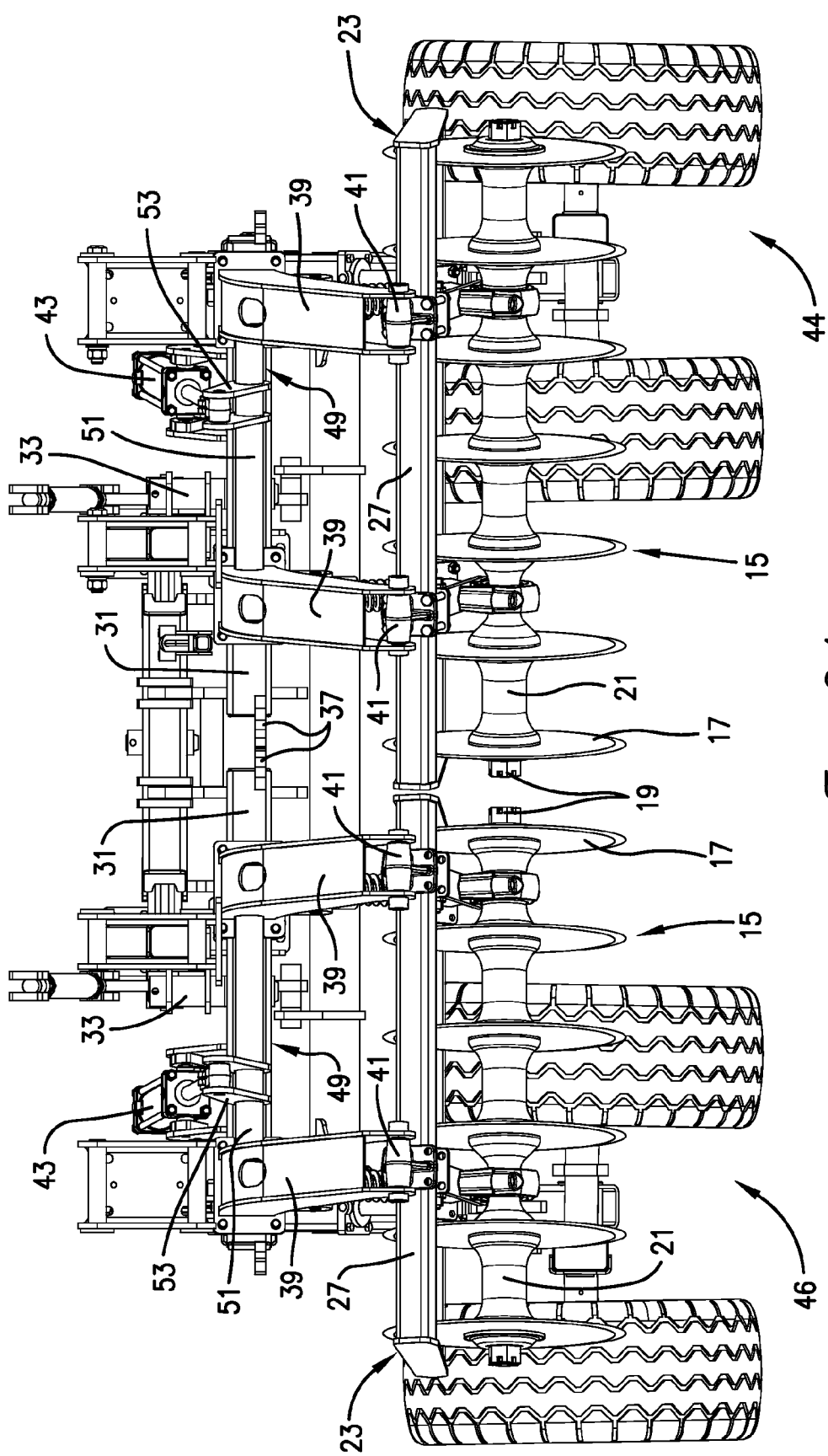
FIG. 31 is a front elevational view of the center section with the front wheels, tillage shanks and much of the main frame removed to reveal details of the blade gangs.
Figure 32:
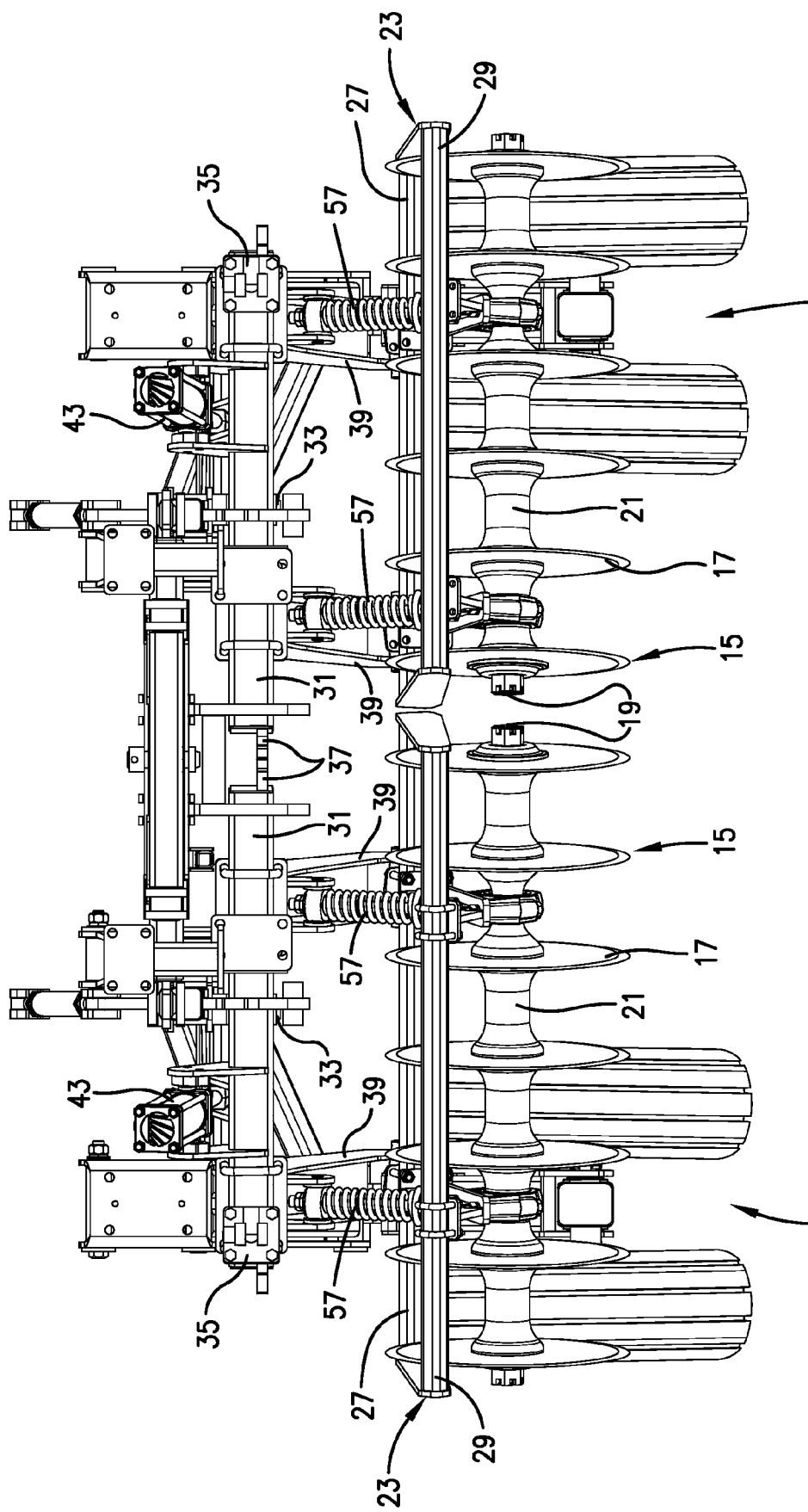
FIG. 32 is a rear elevational view of the front portion of the center section taken from a position just rearward of the blade gangs and with the tillage shanks and much of the main frame removed.
Figure 33:
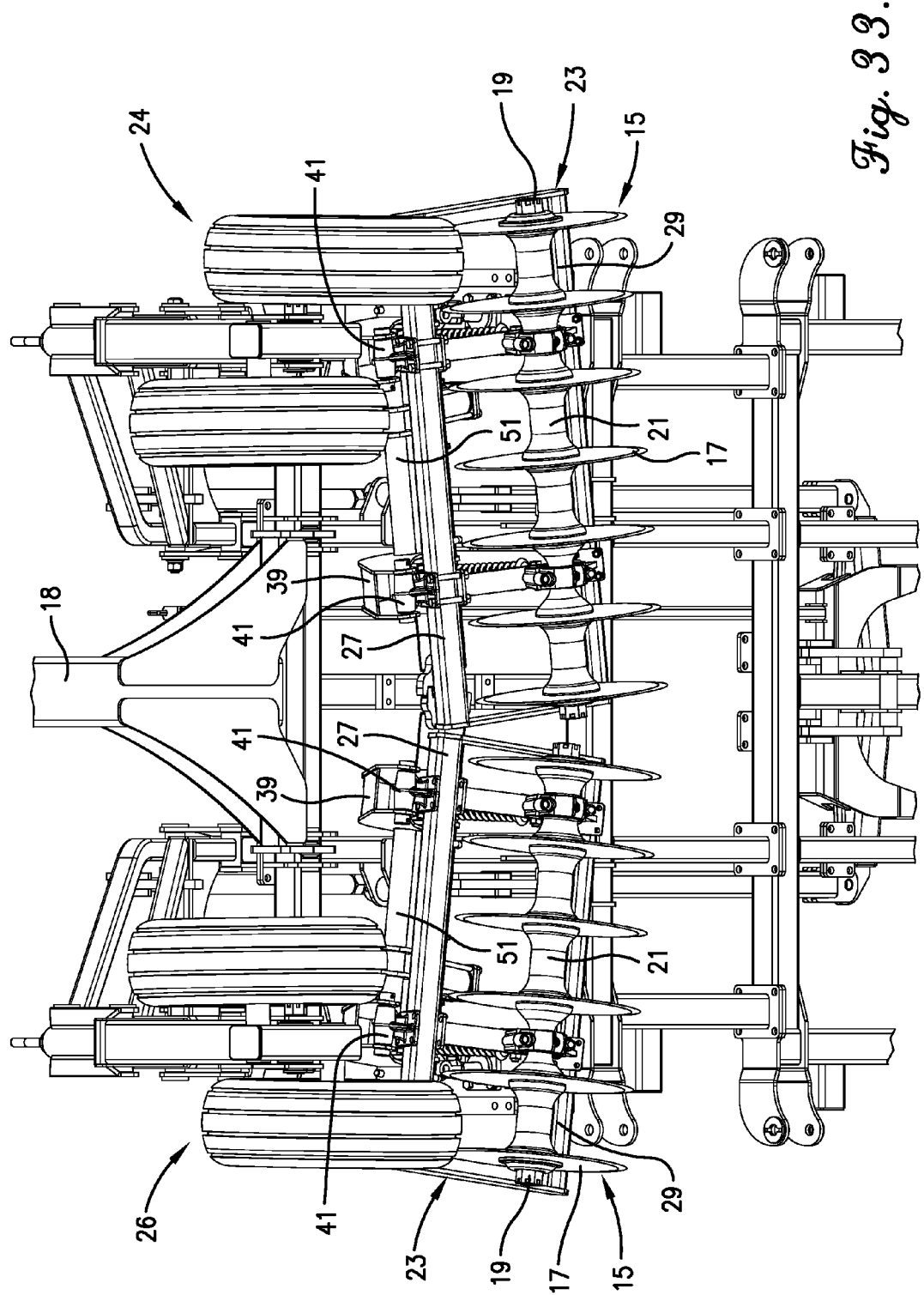
FIG. 33 is a fragmentary, bottom isometric view of the center section taken from a slightly forward position.

FIGS. 1 and 2 show a tillage implement, more specifically a multi-section field cultivator, that is constructed in accordance with the principles of the present invention. In the illustrated embodiment, the implement has a center section 10, a right wing section 12, and a left wing section (not shown). When applied to various parts of the machine, the terms "left" and "right" are utilized as if the machine were being viewed from the rear, looking forwardly. In the remaining FIGS. 3-37, only the center section 12 is illustrated. A number of ground-working tillage tools or shanks 13 are carried by the implement sections at spaced locations and may take a variety of forms as illustrated, for example, in FIGS. 1-23 on the one hand and FIG. 24 on the other hand. The shanks in FIGS. 1-23 include sweeps at their lower end, while the shank in FIG. 24 illustrates the use of interchangeable winged or straight points at its lower end. The shanks 13 are located in substantially the rear half of the machine, while several gangs 15 of circular, freely rotatable blades are arranged in substantially end-to-end relationship across the front of the machine, ahead of shanks 13. Blades 15 may take the form of flat or wavy coulters with smooth, fluted, or notched peripheral edges, or concavo-convex discs that are concave on one side and convex on the other and have smooth, fluted or notched peripheral edges.

Each wing section is connected to center section 10 by hinges 14 in the usual manner so that the implement can "flex" about hinges 14 during field operations and the wing sections can be folded up into upright positions for transport. As illustrated with respect to wing section 12, hydraulic cylinders 16 are connected between center section 10 and the wing sections for raising and lowering the same between their transport and field positions.

A floating front hitch or tongue 18 is attached to the front of a main frame 20 (see also FIGS. 16 and 17) of center section 10 by a transverse pivot 22 (FIG. 4) so that vertical forces are not transferred between the implement and a tractor (not shown) that pulls the implement using hitch 18.

Wheel Suspension System

Center section 10 is equipped with front and rear wheels. The front wheels include a pair of front gauge wheels 24 and 26 on opposite left and right sides of an imaginary, fore-and-aft centerline through center section 10 and hitch 18 extending in the direction of travel of the machine. Each of the front gauge wheels 24, 26 may comprise a single wheel or multiple wheels, but in the embodiment selected for illustration includes a pair of side-by-side, but slightly fore-and-aft offset, wheels 28 and 30 mounted on a walking beam 32 in the usual manner. In a preferred form, each front gauge wheel 24, 26 comprises a castor wheel assembly so that it can pivot freely about a vertical pivot 34 in reaction to ground forces during turns of the machine as it is towed through a field.

Each front gauge wheel 24, 26 is connected to main frame 20 for vertical shifting movement relative to main frame 20. In a preferred form, such vertical movement is accomplished using a four-bar, parallel linkage 36 having a rear end pivotally connected to main frame 20 at a pair of fixed pivot points 38 and a front end pivotally connected to a support for wheels 28, 30 at a pair of vertically shiftable pivot points 40. When front wheels 24, 26 are shifted vertically in unison relative to main frame 20 and are engaging the ground, the front of frame 20 is raised and lowered.

The rear wheels may comprise a rear wheel assembly broadly denoted by the numeral 42. Rear wheel assembly may include a number of single or multiple wheels, but in the embodiment selected for illustration includes at least a pair of left and right lift wheels 44 and 46 on opposite lateral sides of the imaginary centerline of the machine. Each lift wheel 44, 46 preferably includes a pair of side-by-side but slightly fore-and-aft offset ground wheels 48 and 50 attached to a walking beam 52. Each walking beam 52 is pivotally joined to the lower end of an inclined wheel arm 54.

Rear wheel assembly 42 further includes a transverse torque bar 56 (FIGS. 11-15) extending across the rear of main frame 20. Torque bar 56 is eccentrically and pivotally mounted on main frame 20 by depending lugs 58 on frame 20 (FIGS. 16, 17) and eccentric pivots 60 on torque bar 56 (FIGS. 6, 11, 12 and 18-20). Wheel arms 54 are fixed at their upper ends to torque bar 56 such that as torque bar 56 is pivoted on frame 20 about the eccentrically disposed axis defined by pivots 60, rear wheel assembly 42 is raised and lowered relative to frame 20, thus raising and lowering the rear of frame 20 when wheels 44, 46 of rear wheel assembly 42 are engaging the ground. Torque bar 56 and wheels arms 54 thus form a rear wheel support system for rear wheels 44, 46.

Powered mechanism for raising and lowering rear wheel assembly 42 may include a hydraulic cylinder 62 for each rear wheel 44, 46 that is operably connected between the rear wheel and the frame. Each cylinder 62 is connected at its lower rod end to the lower end of wheel arm 54 and at its upper base end to a lug 64 having a pivot connection 66 with a fore-and-aft frame member 20a of frame 20 (FIGS. 16-18, 23). An inclined strut 68 is connected at its opposite ends to member 20a of main frame 20 and the outer end of lug 64. Lug 64 and strut 68 cooperate to form a fixed, non-pivoting anchor structure on frame 20 for the base end of cylinder 62.

A special linkage system 70 operably connects rear wheel assembly 42 with front wheels 24, 26 in such a manner that powered operation of rear wheel assembly 42 by lift cylinders 62 causes corresponding operation of front wheels 24, 26 in unison, yet front wheels 24, 26 are free to shift independently of rear wheel assembly 42 and relative to each other in a non-corresponding manner to accommodate terrain differences between the two front wheels. As used herein, "non-corresponding" shifting of the left and right front wheels 24, 26 relative to frame 20 and each other means that movement of one of the front wheels is not always accompanied by identical movement (in direction and speed) of the other front wheel. One example of non-corresponding movement of two wheels is when one wheel goes up by a certain distance and the other is required to go down by that same distance (e.g., a solid front axle extending between the wheels with a single pivot point in the middle). Another example of non-corresponding movement of two wheels is when the two wheels can move up and down completely independently of one another (e.g., independent front wheel suspension). In a preferred embodiment of the present invention, non-corresponding shifting of the two front wheels 24, 26 includes shifting in equal amounts and in opposite directions in an effort to maintain both front wheels on the ground at all times so that the load of the front of the frame 20 is always equally shared by both wheels.

Linkage system 70 broadly includes a front linkage 72 extending rearwardly from front wheels 24, 26, a rear linkage 74 extending forwardly from rear wheel assembly 42, and a coupling 76 that interconnects front and rear linkages 72, 74. Rear linkage 74 includes a pair of laterally spaced apart, fore-and-aft extending transfer members or links 78 and 80 on opposite sides of the imaginary centerline of the machine, such links 78, 80 being pivotally connected at their rear ends to crank arm structure in the nature of a pair of corresponding, upwardly projecting extension or crank arms 82 and 84 fixed to torque bar 56.

Coupling 76 (detailed in FIGS. 20, 21 and 22) includes a generally U-shaped (in plan) support frame 86 fixed to the front end of rear linkage 74 and a transverse, equalizing rocker bar 88 pivotally carried by support frame 86 for rocking movement about an upright axis through a pin 90. As illustrated particularly in FIG. 21, rocker support frame 86 of coupling 76 includes a pair of vertically spaced, upper and lower, generally U-shaped plates 92 and 94 that receive rocker bar 88 therebetween, the plates 92, 94 being fixed at their rear, pointed ends to the front ends of rear links 78, 80. A relatively short, rigid cross piece 96 is fixed to plates 92, 94 at their front ends.

Coupling 76 is supported above frame 20 for fore-and-aft movement with front and rear linkages 72, 74 by a pair of generally upright, rigidly interconnected arms 98 and 100 that are pivotally connected to forwardly projecting lugs 102 and 104 on cross piece 96 of rocker support frame 86. Arms 98, 100 are pivotally connected at their lower ends to opposite sides of a fore-and-aft stub beam 20b that is rigidly fixed at its opposite ends to cross members 20c and 20d of frame 20.

Front linkage 72 includes a pair of laterally spaced apart, fore-and-aft extending, front actuator arms or links 106 and 108 on opposite sides of the centerline of the machine. Front links 106, 108 are pivotally connected at their rear ends by corresponding upright pivots 110 and 112 to opposite ends of rocker bar 88 on opposite, left and right sides of rocker pivot 90. Front links 106, 108 are operably coupled at their front ends with respective ones of the front wheels 24, 26 by corresponding left and right transfer members or turnbuckles 114 and 116 and by corresponding left and right connection or crank arms 118 and 120 on front wheels 24, 26. Turnbuckles 114, 116 are pivotally connected at their rear ends to corresponding ones of the front links 106, 108 and are pivotally connected at their front ends to the outer ends of corresponding ones of the crank arms 118, 120. Crank arms 118, 120 are rigidly affixed at their lower ends to the lower links of the four-bar linkages 36 of front wheels 24, 26.

The front ends of front links 106, 108 are movably supported above frame 20 by a pair of generally upstanding levers 122 and 124 (FIGS. 11-13, 18). The lower ends of levers 122, 124 are pivotally connected to a cross member 20e of frame 20 (FIGS. 16, 17 and 18) by corresponding lugs 126 and 128, while the upper ends of levers 122, 124 are pivotally connected to the corresponding front links 106, 108 by corresponding pivots 130 and 132.

As the implement traverses a field or is transported over the road or between fields, rear wheels 44, 46 and front gauge wheels 24, 26 of center section 10 cooperate to keep main frame 20 level and support it at a selected height above the ground. The free-floating nature of hitch 18 contributes to maintaining frame 20 level at this time inasmuch as the rear end of hitch 18 merely pivots freely about hitch pivot 22 as frame 20 is shifted up and down between various height positions and the front end of hitch is held at a constant height by the towing tractor. As lift cylinders 62 are extended or retracted to raise or lower rear wheels 44, 46 and thereby raise or lower the rear of frame 20, this motion is transmitted to front wheels 24, 26 by linkage system 70 to simultaneously raise or lower the front of frame 20. Coupling 76, including rocker bar 88, rocker support frame 86, and rocker pivot 90, simply shifts bodily fore-and-aft as a unit with the rest of linkage system 70 at this time. Rocker bar 88 of system 70 stays perpendicular to the line of action of rear linkage 74 during such height adjustment as linkage system 70 effectively operates as a rigid link at this time, and front wheels 24, 26 shift in a corresponding manner.

Rocker bar 88 also stays perpendicular to the line of action of rear linkage 74 when frame 20 is being held by front wheels 24, 26 and rear wheels 44, 46 at a selected height above the ground. However, if one of the front wheels 24, 26 encounters a change in terrain not encountered by the other front wheel 24, 26 (as illustrated, for example in FIG. 9), the front wheels 24, 26 shift vertically relative to frame 20 in a non-corresponding manner in equal and opposite directions to maintain both front wheels in engagement with the ground, thereby keeping the load of the front of frame 20 equally shared by both front wheels. Such action is permitted because the rocker bar 88 is allowed to pivot about its upright pivot 90 within support frame 86 in the appropriate direction and to the appropriate extent at this time, even though upright pivot 90 and rear linkage 74 do not shift fore-and-aft at all. Thus, rear wheels 44, 46 are not affected by the terrain-compensating shifting of front wheels 24, 26 relative to frame 20.

Prior floating hitch machines could experience substantial stress and strain at critical locations as significant differences in terrain were encountered between the two front wheels. If one of the front wheels encountered a high spot not seen by the other front wheel, the high spot could tend to lift the entire front of the machine out of the ground, placing all the load on the one wheel.

It will therefore be seen that four-bar linkages 36, front linkage 72, rocker bar 88, pivot 90, and rocker support frame 86 all comprise parts of a support system for front wheels 24, 26 that allows non-corresponding shifting of front wheels 24, 26 relative to main frame 20. Yet, the front wheel support system is such that front wheels 24, 26 are able to be shifted in a corresponding manner with one another and with rear wheels 44, 46 when the support system for rear wheels 44, 46 is actuated.

Gang Angle and Gang Depth Adjustability

In the illustrated embodiment, each section of the implement is provided with a pair of the blade gangs 15 arranged substantially end-to-end, although more or less of the gangs could be used on each section without departing from the principles of the present invention. Each of the gangs 15 can be angle-adjusted to change the angle of the gang with respect to the path of travel of the implement and depth-adjusted to change the depth of penetration of the blades into the ground, all without requiring raising or lowering of the frame 20 such that the depth of penetration of shanks 13 can remain unchanged as the angles and/or depths of the gangs are varied. Such angle and depth adjustments can also be carried out on-the-go and from the seat of the towing tractor such that changes in the aggressiveness of the blades to suit the job at hand and the field conditions encountered can readily be made as needed.

Using center section 10 as an example, and with particular reference to FIGS. 25-36, it will be seen that each gang 15 includes a series of circular blades 17 arranged for rotation about a common rotation axis defined by a mounting shaft 19 (FIGS. 30-36) that extends the full length of the gang. Spacers 21 on shaft 19 maintain blades 17 separated from one another along the axis of blade rotation while permitting blades 17 to rotate due to engagement with the ground as the machine is moving forwardly. Shaft 19 is supported below a rigid, rectangular, open box frame 23 by a pair of axially spaced, fore-and-aft extending cross bars 25 fixed at opposite ends to front and rear members 27 and 29 respectively of box frame 23. Cross bars 25 effectively serve as portions of box frame 23.

Each box frame 23 is supported below a transversely extending beam 31 (FIGS. 30-36) that comprises a first section of the gang support system for the gang 15. Intermediate its opposite ends, beam 31 is, in turn, pivotally attached to main frame 20 by a vertical pivot joint 33 for fore-and-aft swinging movement of beam 31 and gang 15 about an upright gang angle pivot axis defined by pivot joint 33. Powered angle adjustment of beam 31 and its gang 15 is effected via a gang angle actuator in the form of a double-acting hydraulic cylinder 35 connected between the outer end of beam 31 and a transverse member 20g of main frame 20, at a location spaced from pivot joint 33. It will be seen that the upright pivot axis defined by pivot joint 33 is substantially orthogonal to the blade rotation axis defined by shaft 19.

The term "gang angle" as used herein refers to the angle between a typical blade 17 of gang 15 and the path of travel of the implement. In preferred embodiments, the stroke of cylinder 35 is such that each gang 15 may be adjusted between a minimum gang angle of 0 degrees up to a maximum gang angle of at least 5, 6, 7, or 8 degrees and/or not more than 20, 15, or 10 degrees. Alternatively, each gang 15 may be adjusted through an angle of at least 2, 4, 6, or 8 degrees and/or not more than 30, 20, 15, or 10 degrees.

It is important that the gangs on the machine be synchronized such that all of the gangs 15 on one side of the imaginary center line are disposed at one gang angle, and all of the gangs 15 on the other side of the center line are disposed at an equal but opposite gang angle. Such synchronization can be carried out in a number of ways, or in a combination of different ways, such as by using an electronic synchronizing mechanism, a hydraulic synchronizing mechanism, and/or a mechanical synchronizing mechanism. In the illustrated embodiment, all of the angle adjustment cylinders 35 on one side of the center line are plumbed in a master/slave relationship, such as, for example, wherein the right cylinder 35 on center section 10 is a master to one of the cylinders 35 on right wing section 12 which is, in turn, a master to the other of the cylinders 35 on right wing section 12. Similarly, on the other side of the center line, the left angle cylinder 35 is a master to one of the cylinders (not shown) on the left wing section which is, in turn, a master to the other cylinder on the left wing section. The two angle cylinders 35 on center section 10 are plumbed in parallel, but synchronization of the left and right sides of the machine is assured because the two gangs 15 on center section 10 are mechanically synchronized with one another through intermeshing finger gear teeth 37 (FIGS. 29-36) on the inboard ends of beams 31. Thus, gangs 15 on one side of the machine stay in synchronized relationship at all times with those on the other side, even though they swing in equal and opposite directions. Various mechanical linkages could also be used between the two sides, as well as between the gangs on the same side.

Figure 34:
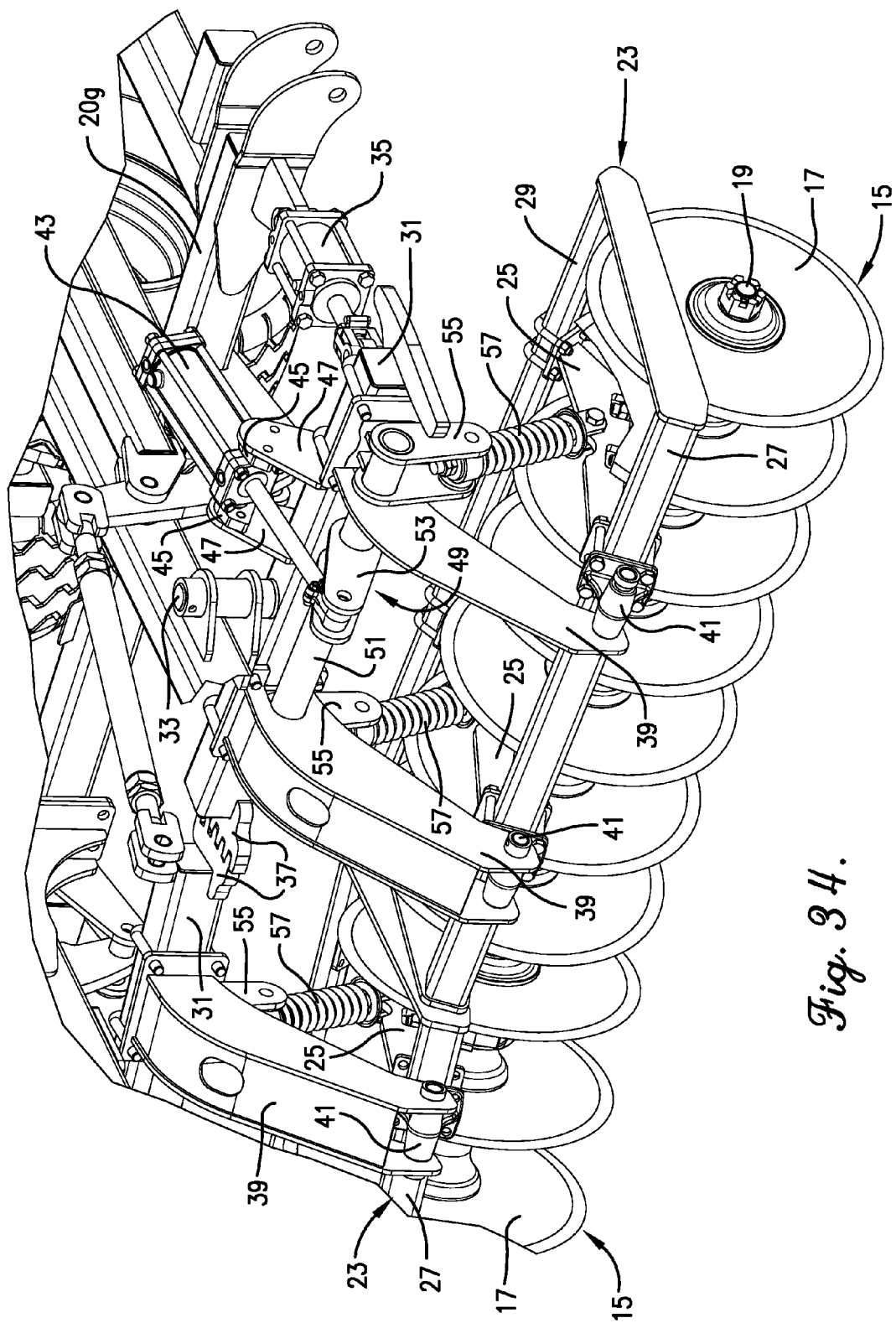
FIG. 34 is a fragmentary, left front isometric view of the center section with portions of the implement removed to reveal details of construction of the gang angle and depth adjusting mechanisms, the gangs being illustrated in their fully adjustably lowered position.
Figure 35:
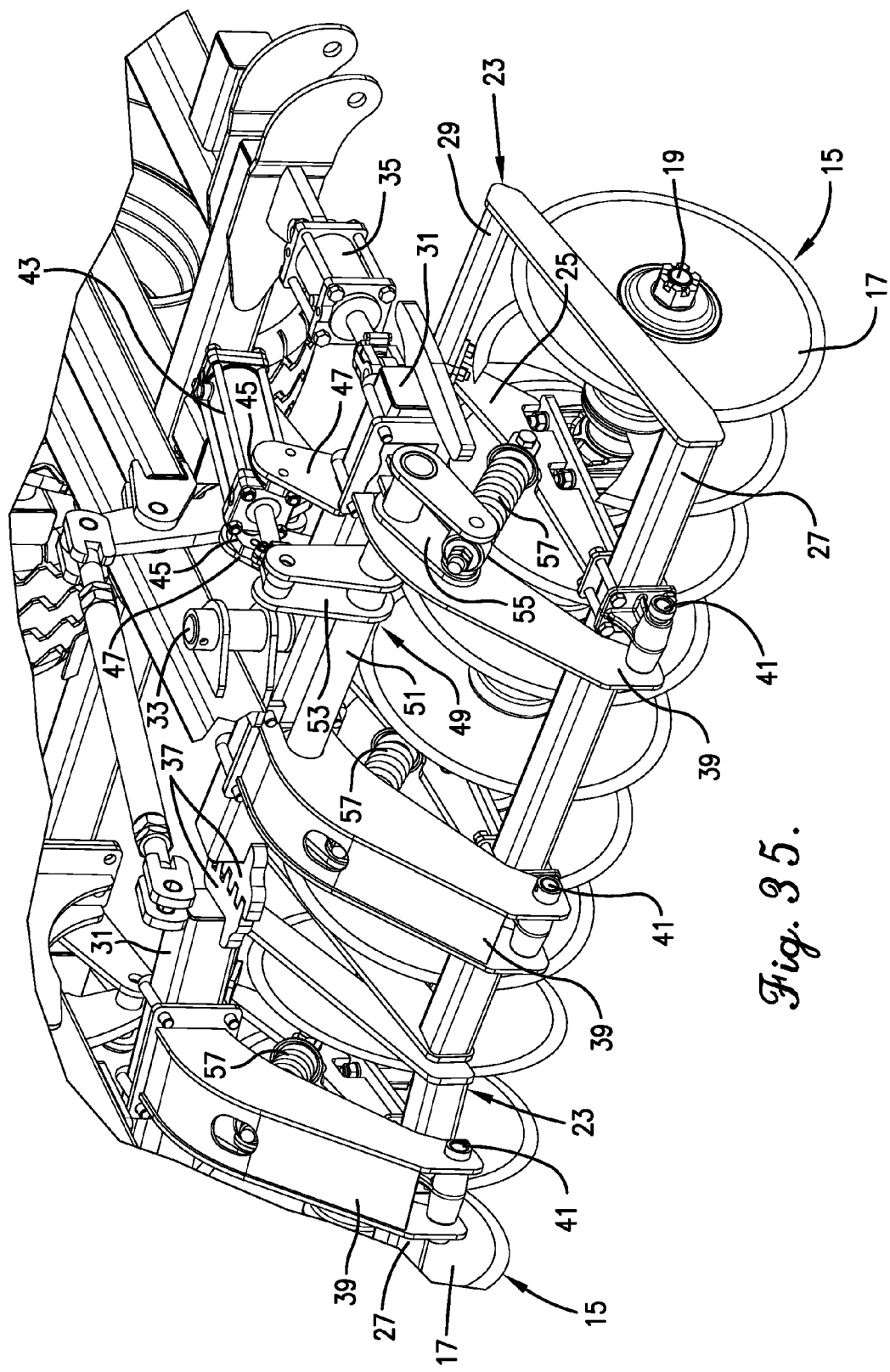
FIG. 35 is a fragmentary, left front isometric view of the center section similar to FIG. 34 but with the gangs illustrated in their fully adjustably raised position.
Figure 36:
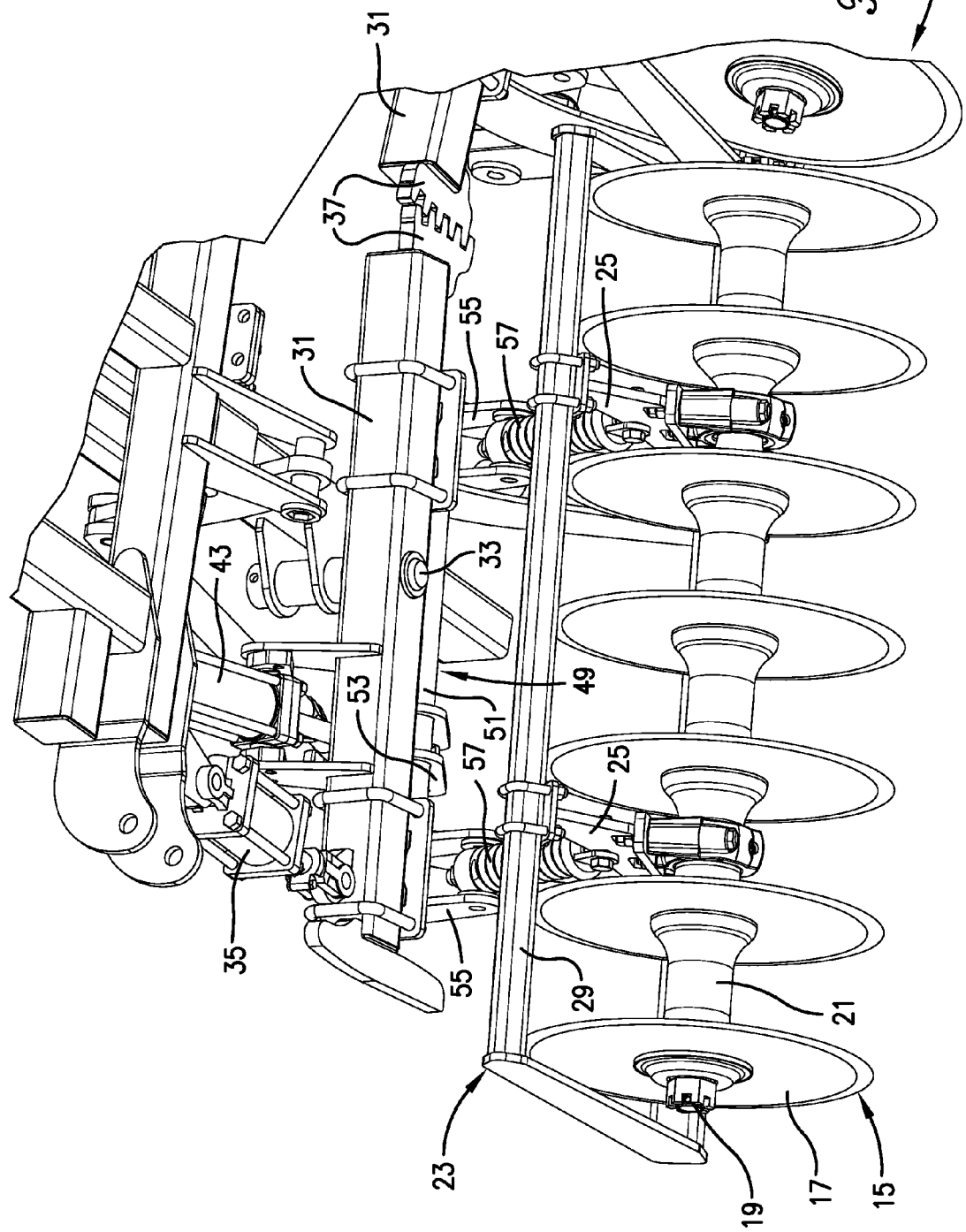
FIG. 36 is a fragmentary, bottom left rear isometric view of the front portion of the center section taken just rearward of the blade gangs with the tillage shanks and much of the main frame removed.

With particular reference to FIGS. 34-36, it may be seen that angularly adjustable beam 31 has a pair of downwardly and forwardly projecting, arched bracket arms 39 fixed thereto in a cantilevered manner at spaced locations on opposite sides of angle pivot joint 33 (parts of the right bracket arm 39 being removed to reveal details of construction). Each bracket arm 39 comprises a generally inverted U-shaped weldment that is open on its underside. As bracket arms 39 are fixed to beam 31, they comprise another portion of a first support section of the gang support system for each gang 15, along with beam 31.

Box frame 23 comprises a second section of the gang support system for each gang 15 and is pivotally coupled to the first support section via a pair of horizontal depth pivot joints 41 at the lower front ends of bracket arms 39. Pivot joints 41 cooperatively define a gang depth pivot axis for box frame 23, and thus gang 15, that extends parallel to the gang rotation axis defined by shaft 19 and is orthogonal to the upright gang angle pivot axis defined by upright pivot joint 33.

The gang support system for each gang 15 further includes a gang depth actuator in the form of a double-acting hydraulic cylinder 43 that is operably coupled with box frame 23 at a location spaced from the gang depth pivot axis defined by pivot joints 41. Cylinder 43 is mounted on beam 31 outboard of angle joint 33 by a pair of trunnions 45 at the upper ends of a pair of spaced, upstanding lugs 47 on beam 31 such that cylinder 43 can rock up and down as needed during depth adjustment of gang 15.

The gang support system for each gang 15 additionally includes depth transfer mechanism broadly denoted by the numeral 49 that operably couples depth cylinder 43 with box frame 23 at a location spaced from the depth pivot axis defined by pivot joints 41. Depth transfer mechanism 49 includes a tubular torque bar 51 that is suitably bearing-supported by bracket arms 39 for rotation about its own longitudinal axis along the front side of beam 31, thus defining a generally horizontal depth transfer axis that is spaced from but parallel to the gang depth pivot axis defined by pivot joints 41 and the blade rotation axis defined by shaft 19. The depth transfer axis defined by torque bar 51 is orthogonal to the gang angle pivot axis defined by upright pivot joint 33.

Depth transfer mechanism 49 further includes a depth lever arm 53 fixed to and projecting outwardly from torque bar 51 at a location between the two bracket arms 39. The rod end of depth cylinder 43 is pivotally connected to the outer end of lever arm 53 for causing torque bar 51 to rotate when cylinder 43 is extended or retracted. In addition, depth transfer mechanism 49 includes a pair of depth adjustment arms 55 fixed to and projecting outwardly from torque bar 51 adjacent opposite ends thereof within the open undersides of bracket arms 39. Depth lever arm 49 is thus disposed between the two depth adjustment arms 55, and it will be seen that depth adjustment arms 55 are angularly offset from depth lever arm by somewhat more than 90 degrees.

Depth transfer mechanism 49 also includes a pair of spring-loaded, lost-motion link assemblies 57 connected between respective ones of the depth adjustment arms 55 and cross bars 25 of box frame 23 at locations spaced from the depth transfer axis defined by depth pivot joints 41. Link assemblies 57 are operable to apply lifting force to box frame 23 and thus gang 15 when depth cylinder 43 is refracted and to apply yieldable, biasing down force against box frame 23 and gang 15 when depth cylinder 43 is extended and blades 17 are engaging the ground. Thus, link assemblies 57 can be used to pull gang 15 up to a fully adjustably raised position (FIG. 35) relative to main frame 20 and hold it there when depth cylinder 43 is fully refracted, whether main frame 20 is fully raised as in FIG. 28 or not. Link assemblies 57 can also continue to pull upwardly on gang 15 as it is lowered to a fully adjustably lowered position (FIG. 34) and then hold it against movement beyond such lowermost position when depth cylinder 43 is fully extended, even when main frame 20 remains in its raised, transport position of FIG. 27. When main frame 20 is in its lowered field-working position, link assemblies 57 can be used to yieldably bias blades 17 down against the ground and to function as shock absorbers when for accommodating surface irregularities, stones, and other objects encountered by the blades 17 of gang 15.

Figure 37:
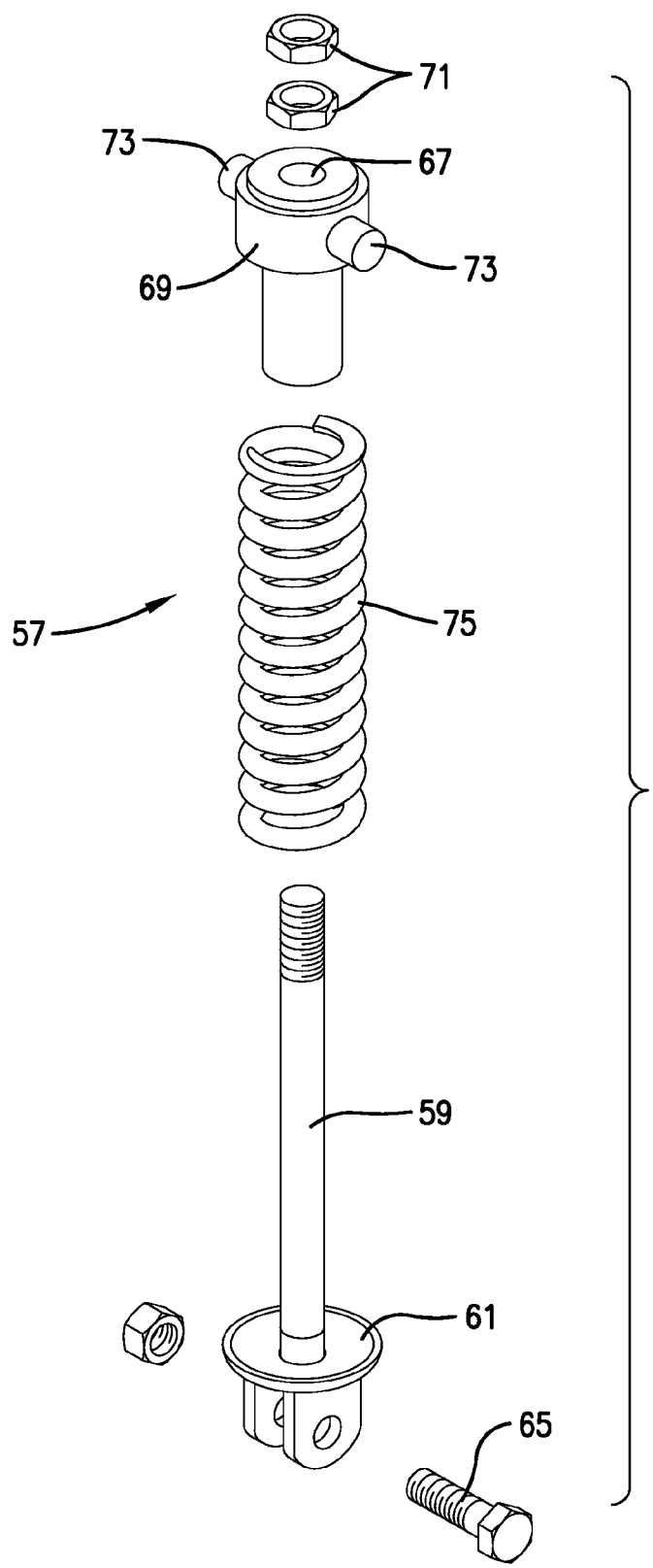
FIG. 37 is an exploded isometric view of one of the spring-loaded shock absorbers associated with each blade gang.

FIG. 37 illustrates construction details of a typical link assembly 57 permitting the desired function. Link assembly 57 includes a central rod 59 having a circular spring seat 61 and a pair of mounting ears 63 fixed to the lower end thereof. Ears 63 receive a pivot bolt 65 that connects the lower end of link assembly 57 to cross bar 25 of box frame 23. Rod 59 is slidingly received within and passes through and beyond a bore 67 in a cap 69 at the upper end of the link assembly, and a pair of nuts 71 are threaded onto the upper end of rod 59 that projects beyond cap 69. Thus, nuts 71 limit the extent to which rod 59 may slip downwardly through cap 69. Pintles 73 projecting outwardly from opposite sides of cap 69 serve to pivotally attach the upper end of link assembly 57 to depth adjustment arms 55, and a coiled compression spring 75 encircling rod 59 is trapped between seat 61 and the bottom of cap 69. Thus, rod 59 acts as a tension link to pull upwardly on box frame 23 when depth adjustment arms 55 are rotated upwardly by torque bar 51 and nuts 71 are pulled down against cap 69. On the other hand, rod 59 slips upwardly through cap 69 in a lost motion manner when depth adjustment arms 55 are in a fixed position and box frame 23 is pushed upwardly by surface irregularities, stones, or other encountered objects. Coil spring 75 yieldably resists such lost motion upward movement of rod 59 through cap 69 so as to bias gang 15 downwardly.

When depth cylinders 43 extend, torque bars 51 are rotated about their respective longitudinal axes by lever arms 53, which in turn rotates depth adjustment arms 55 downwardly to allow box frames 23 and gangs 15 to swing downwardly about pivots 41. Blades 17 are thus allowed to sink more deeply into the ground and are encouraged to do so by the compression springs 75 of link assemblies 57. Of course, if blades 17 roll over stones or other objects, springs 75 permit box frame 23 to rock upwardly under resistance about pivots 41 to accommodate such momentary encounters. On the other hand, when depth cylinders 43 retract, lever arms 53 cause torque bars 51 to rotate in the opposite direction about their respective longitudinal axes, which in turn rotates depth adjustment arms 55 upwardly to pull box frames 23 and gangs 15 upwardly about pivots 41 via rods 59 of link assemblies 57. Depending upon the extent to which depth cylinders 43 retract, gangs 15 may be raised a little or a lot.

It will be seen that having each gang 15 both angle and depth adjustable relative to main frame 20 provides a high degree of flexibility for the operator. If need be, he can readily adjust the gang angle by actuating angle adjust cylinders 35 in the appropriate direction to pivot beams 31 accordingly. Concurrently, or independently of angle adjusting, he can readily adjust the depth of penetration of the gangs 15 by actuating depth cylinders 43 in the appropriate direction so as to raise or lower gangs 15 relative to beams 31 and main frame 20. This allows him to preset the blades 17 for the type of operation he needs to perform, e.g., light tillage or heavier residue incorporation, and also to adjust on-the-go for changing field conditions as they may be encountered. Moreover, it allows him to make these adjustments to gangs 15 without changing the depth at which shanks 13 may be running, inasmuch as gangs 15 may be angle adjusted about pivot joints 33 and depth adjusted about pivot joints 41 without concurrently raising or lowering main frame 20.

The arrangement of the components of the gang support system may be such that gang 15 can be shifted vertically relative to main frame 20 by a distance of at least 2, 4, 6, 8, 10, or 12 inches and/or not more than 36, 24, or 18 inches. Each of the blade gangs 15 can comprise at least 3, 5, or 7 of the blades 17 and/or not more than 30, 20, or 15 of the blades. The implement can comprise at least 3, 4, 5, or 6 of the blade gangs 15, each configured for synchronous andle and depth adjustment. The angle adjust cylinders 35 and depth adjust cylinders 43 can be simultaneously actuated. Preferably, the depth adjust cylinders 43 are all plumbed in a master-slave rephasing arrangement with one another, but on a separate circuit from the angle adjust cylinders 35, so as to remain synchronized with one another. A suitable controller (not shown) can be provided in the cab of the towing tractor to provide remote control of the gang angle cylinders 35 and the depth adjust cylinders 43.

The inventor hereby states his intent to rely on the Doctrine of Equivalents to determine and assess the reasonably fair scope of the present invention as it pertains to any apparatus not materially departing from but outside the literal scope of the invention as set forth in the following claims.

The invention claimed is:

1. A tillage implement comprising:
   a substantially rigid main frame;
   a hitch coupled to and extending forwardly from a front portion of said main frame with respect to a direction of travel of the main frame;
   a blade gang comprising a plurality of spaced-apart blades rotatable on a common blade rotation axis; and
   a gang support system for coupling said blade gang to said main frame,
   wherein said gang support system comprises a gang angle actuator and a gang depth actuator,
   wherein said gang angle actuator is configured to pivot said blade gang relative to said main frame on a substantially upright gang angle pivot axis to thereby adjust the angle of said blade gang relative to the direction of travel of said tillage implement,
   wherein said gang depth actuator is configured to shift said blade gang upward and downwardly relative to said main frame to thereby adjust the depth of said blade gang,
   wherein said gang support system comprises a first support section coupled to said main frame and a second support section coupled to said first support section and said blade gang,
   wherein said gang angle actuator is configured to pivot said first support section relative to said main frame on said gang angle pivot axis and said gang depth actuator is configured to pivot said second support section relative to said first support section on a substantially horizontal gang depth pivot axis,
   wherein said gang support system further comprises a depth transfer mechanism coupled to said first support section, said second support section, and said gang depth actuator,
   wherein said depth transfer mechanism causes shifting of said second support section relative to said first support section when said depth transfer mechanism is shifted by said gang depth actuator,
   wherein said depth transfer mechanism is rotatable on a substantially horizontal depth transfer axis when shifted by said gang depth actuator,
   wherein said depth transfer mechanism comprises at least one depth lever arm and at least one depth adjustment arm,
   wherein said gang depth actuator is coupled to said depth lever arm at a location spaced from said depth transfer axis,
   wherein said depth adjustment arm is coupled to said second support section at a location spaced from said depth transfer axis,
   wherein said depth transfer mechanism comprises a depth torque bar extending along said depth transfer axis,
   wherein said at least one depth lever arm and said at least one depth adjustment arm are coupled to and extend outwardly from said depth torque bar.

2. A tillage implement as claimed in claim 1,
   wherein said first support section is coupled to said main frame by an angle pivot joint located at said gang angle pivot axis,
   wherein said gang angle actuator is coupled to said first support section at an angle actuator attachment location spaced from said gang angle pivot axis.

3. A tillage implement as claimed in claim 1,
   wherein said second support section is coupled to said first support system by a depth pivot joint located at said gang depth pivot axis.

4. A tillage implement as claimed in claim 1,
   wherein said depth transfer axis and said gang depth pivot axis are spaced from one another.

5. A tillage implement as claimed in claim 4,
   wherein said depth transfer axis and said gang depth pivot axis are substantially parallel to one another.

6. A tillage implement as claimed in claim 4,
   wherein said blade rotation axis, said gang depth pivot axis, and said dept transfer axis are substantially parallel to one another.

7. A tillage implement as claimed in claim 6
   wherein said gang angle pivot axis is substantially orthogonal to said blade rotation axis, said gang depth pivot axis, and said depth transfer axis.

8. A tillage implement as claimed in claim 1,
   wherein said depth transfer mechanism comprises at least two of said depth adjustment arms spaced from one another along the length of said depth torque bar.

9. A tillage implement as claimed in claim 8,
   wherein said depth lever arm is coupled to said depth torque bar at a location between at least two of said depth adjustment arms.

10. A tillage implement as claimed in claim 1,
    wherein said depth transfer mechanism further comprises a biasing mechanism connecting said depth adjustment arm to said second support section.

11. A tillage implement as claimed in claim 10,
    wherein said biasing mechanism is a shock absorber.

12. A tillage implement as claimed in claim 1,
    wherein said tillage implement comprises an additional blade gang and an additional gang support system,
    wherein said additional gang support system comprises an additional gang angle actuator and an additional gang depth actuator,
    wherein said additional gang angle actuator is configured to pivot said additional blade gang relative to said main frame on an additional substantially upright gang angle pivot axis to thereby adjust the angle of said additional blade gang relative to the direction of travel of said tillage implement,
    wherein said additional gang depth actuator is configured to shift said blade gang upward and downward relative to said main frame to thereby adjust the depth of said additional blade gang.

13. A tillage implement as claimed in claim 12,
further comprising a gang synchronizing mechanism for causing synchronization of the angle at which said blade gangs extend relative to the direction of travel of said tillage implement.

14. A tillage implement as claimed in claim 13,
wherein said synchronizing mechanism comprises one of an electronically controlled synchronizing mechanism, a hydraulic synchronizing mechanism, and a mechanical synchronizing mechanism.

15. A tillage implement as claimed in claim 13,
wherein said additional blade gang is positioned to one side of said blade gang,
said synchronizing mechanism comprising a finger gear.

16. A tillage implement as claimed in claim 13,
wherein said additional blade gang is spaced in a fore-and-aft direction from said blade gang,
said synchronizing mechanism comprising a mechanical angle linkage assembly extending between said additional blade gang and said blade gang.

17. A tillage implement as claimed in claim 13,
wherein said synchronizing mechanism causes said additional blade gang to rotate in the opposite direction of said blade gang when said blade gangs are rotated relative to said main frame.

18. A tillage implement as claimed in claim 1,
wherein said gang support system is configured to permit said blades to be angled relative to the direction of travel of said tillage implement between a minimum gang angle of 0 up to a maximum gang angle of 20 degrees.

19. A tillage implement as claimed in claim 1,
wherein said gang support system is configured to permit rotation of said blade gang on said gang angle pivot axis through an angle of at least 2 degrees and/or not more than 30 degrees.

20. A tillage implement as claimed in claim 1,
wherein said gang support system is configured to permit vertical shifting of said blade gang relative to said frame by a distance of at least 2 inches and/or not more than 36 inches.

21. A tillage implement as claimed in claim 1,
wherein said tillage implement comprises a gang position adjustment controller located remotely from said gang angle actuator and said gang depth actuator.

22. A tillage implement as claimed in claim 21,
wherein said gang position controller is configured for positioning in a cab of a tractor pulling said tillage implement.

23. A tillage implement as claimed in claim 21,
wherein said gang angle and gang depth actuators are configured for actuation during operation of said tillage implement such that the angle of said blade gangs and the depth of said blade gangs can be adjusted during operation of said tillage implement.

24. A tillage implement as claimed in claim 21,
wherein said gang angle and gang depth actuators can be simultaneously actuated.

25. A tillage implement as claimed in claim 1,
wherein each of said blade gangs comprises at least 3 of said blades and/or not more than 30 of said blades.

26. A tillage implement as claimed in claim 1,
wherein said tillage implement comprises at least 3 of said blade gangs, each configured for synchronous angle and depth adjustment.

27. A tillage implement as claimed in claim 1,
wherein said blades are one of coulter blades and disc blades.

28. A tillage implement as claimed in claim 27,
wherein said coulter blades are substantially flat.

29. A tillage implement as claimed in claim 27,
wherein said coulter blades are one of smooth, fluted, notched, and wavy.

30. A tillage implement as claimed in claim 27,
wherein said disc blades are concave on one side and convex on the opposite side.

31. A tillage implement as claimed in claim 1,
wherein said tillage implement comprises a field cultivator.

32. A tillage implement as claimed in claim 1,
further including a plurality of ground-working tillage shanks fixed to said main frame and a plurality of ground-engaging wheels supporting said main frame for travel along said path of travel,
said wheels being adjustably shiftable up and down relative to said frame for adjusting the depth of ground penetration by said shanks.

33. A tillage implement comprising:
a substantially rigid main frame;
a plurality of tillage shanks fixed to said main frame for working the ground as the main frame is advanced along a path of travel;
a plurality of ground-engaging wheels supporting said main frame for movement along said path of travel,
said wheels being adjustably shiftable up and down relative to said main frame for adjusting height of the main frame above the ground and the depth of penetration of said shanks into the ground;
a blade gang comprising a plurality of spaced-apart blades rotatable on a common blade rotation axis,
said blade gang being adjustably supported by an actuating system on said main frame for pivoting movement about an upright gang angle pivot axis for adjusting the angle of said blade gang relative to said path of travel and for pivoting movement about a substantially horizontal gang depth pivot axis for adjusting the vertical position of said blade gang relative to said main frame,
wherein said actuating mechanism is operably coupled with said blade gang in such a manner that said actuating mechanism may carry out powered angle and height adjustment of the blade gang without raising or lowering said main frame and said tillage shanks,
wherein said actuating mechanism comprises a gang angle actuator and a gang depth actuator, wherein said gang angle actuator is configured to pivot said blade gang on said gang angle pivot axis, and wherein said gang depth actuator is configured to shift said blade gang upward and downwardly on said gang depth pivot axis,
wherein said actuating mechanism further comprises a depth transfer mechanism coupled between said gang depth actuator and said blade gang, wherein said depth transfer mechanism is rotatable on a substantially horizontal depth transfer axis when shifted by said gang depth actuator, wherein rotation of said depth transfer mechanism causes shifting of said blade gang upward and downwardly about said gang depth pivot axis,
wherein said depth transfer mechanism comprises a depth torque bar extending along said depth transfer axis, a depth lever arm coupled to and extending outwardly from said depth torque bar, and a depth adjustment arm coupled to and extending outwardly from said depth torque bar, wherein said gang depth actuator is connected to said depth lever arm at a location spaced from said depth transfer axis, and wherein said depth adjustment arm is linked with said blade gang at a location spaced from said depth transfer axis.

34. A tillage implement comprising:

a substantially rigid main frame;

a hitch coupled to and extending forwardly from a front portion of said main frame with respect to a direction of travel of the main frame;

a blade gang comprising a plurality of spaced-apart blades rotatable on a common blade rotation axis; and a gang support system for coupling said blade gang to said main frame, wherein said gang support system comprises a gang angle actuator and a gang depth actuator, wherein said gang angle actuator is configured to pivot said blade gang relative to said main frame on a substantially upright gang angle pivot axis to thereby adjust the angle of said blade gang relative to the direction of travel of said tillage implement, wherein said gang depth actuator is configured to shift said blade gang upward and downwardly relative to said main frame to thereby adjust the depth of said blade gang, wherein said gang support system further comprises a depth transfer mechanism coupled between said gang depth actuator and said blade gang, wherein said depth transfer mechanism is rotatable about a substantially horizontal depth transfer axis when shifted by said gang depth actuator, wherein rotation of said depth transfer mechanism causes shifting of said blade gang upward and downwardly about said gang depth pivot axis, wherein said depth transfer mechanism comprises a depth torque bar extending along said depth transfer axis, a depth lever arm coupled to and extending outwardly from said depth torque bar, and a depth adjustment arm coupled to and extending outwardly from said depth torque bar, wherein said gang depth actuator is coupled to said depth lever arm at a location spaced from said depth transfer axis, and wherein said depth adjustment arm is linked with said blade gang at a location spaced from said depth transfer axis.

\* \* \* \* \*